US009001255B2

(12) United States Patent
Matsuzawa et al.

(10) Patent No.: US 9,001,255 B2
(45) Date of Patent: Apr. 7, 2015

(54) IMAGING APPARATUS, IMAGING METHOD, AND COMPUTER-READABLE STORAGE MEDIUM FOR TRIMMING AND ENLARGING A PORTION OF A SUBJECT IMAGE BASED ON TOUCH PANEL INPUTS

(75) Inventors: Yoshinori Matsuzawa, Hachioji (JP); Atsushi Maruyama, Sagamihara (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 105 days.

(21) Appl. No.: 13/613,823

(22) Filed: Sep. 13, 2012

(65) Prior Publication Data

US 2013/0083222 A1 Apr. 4, 2013

(30) Foreign Application Priority Data

Sep. 30, 2011 (JP) ................................. 2011-218185
Sep. 30, 2011 (JP) ................................. 2011-218186

(51) Int. Cl.
*H04N 5/222* (2006.01)
*H04N 5/232* (2006.01)
*H04N 5/262* (2006.01)

(52) U.S. Cl.
CPC ....... *H04N 5/23212* (2013.01); *H04N 5/23216* (2013.01); *H04N 5/23293* (2013.01); *H04N 5/23296* (2013.01); *H04N 5/2628* (2013.01)

(58) Field of Classification Search
CPC .......................... H04N 5/23293; H04N 5/2228
USPC .............. 348/333.01–333.05, 333.11–333.12
See application file for complete search history.

(56) References Cited

U.S. PATENT DOCUMENTS

| 8,159,556 | B2 * | 4/2012 | Maeda ........................ 348/223.1 |
| 2003/0103156 | A1 * | 6/2003 | Brake et al. .............. 348/333.01 |
| 2010/0208107 | A1 * | 8/2010 | Nonaka et al. ........... 348/240.99 |
| 2010/0302409 | A1 * | 12/2010 | Matas et al. ............. 348/231.99 |
| 2011/0007177 | A1 * | 1/2011 | Kang .......................... 348/222.1 |
| 2011/0013049 | A1 * | 1/2011 | Thorn ......................... 348/240.3 |
| 2011/0043651 | A1 * | 2/2011 | Nonaka et al. ............. 348/220.1 |
| 2012/0002094 | A1 * | 1/2012 | Jelicz ....................... 348/333.11 |

FOREIGN PATENT DOCUMENTS

| JP | 10-004531 | 1/1998 |
| JP | 2005-078009 | 3/2005 |
| JP | 2006-067044 | 3/2006 |

(Continued)

OTHER PUBLICATIONS

Office Action from corresponding Japanese Patent Application Serial No. 2011-218185 (2 pgs.), mailed Sep. 24, 2014, with translation (3 pgs.).

(Continued)

*Primary Examiner* — Kelly L Jerabek
(74) *Attorney, Agent, or Firm* — John C. Pokotylo; Straub & Pokotylo

(57) ABSTRACT

An imaging apparatus includes an imaging unit that generates image data of a subject image obtained via a lens unit, a display unit that displays an image corresponding to the image data generated by the imaging unit, an input unit that receives input for specifying an area of a portion of the image displayed by the display unit, and a display controller that controls a display mode for confirming a specified image corresponding to the area of which input is received by the input unit.

17 Claims, 29 Drawing Sheets

(56) References Cited

FOREIGN PATENT DOCUMENTS

| | | |
|---|---|---|
| JP | 2006-245793 | 9/2006 |
| JP | 2009-237214 | 10/2009 |
| JP | 2010-258904 | 11/2010 |
| JP | 2011-103681 | 5/2011 |

OTHER PUBLICATIONS

Office Action from corresponding Japanese Patent Application Serial No. 2011-218186 (2 pgs.), mailed Sep. 24, 2014, with translation (3 pgs.).

* cited by examiner

FIG.23
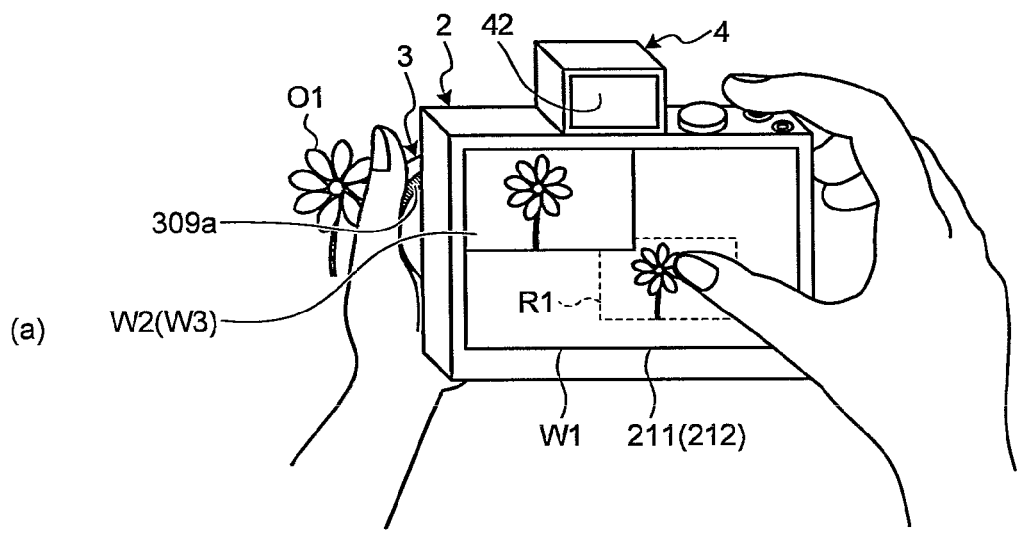
(a)
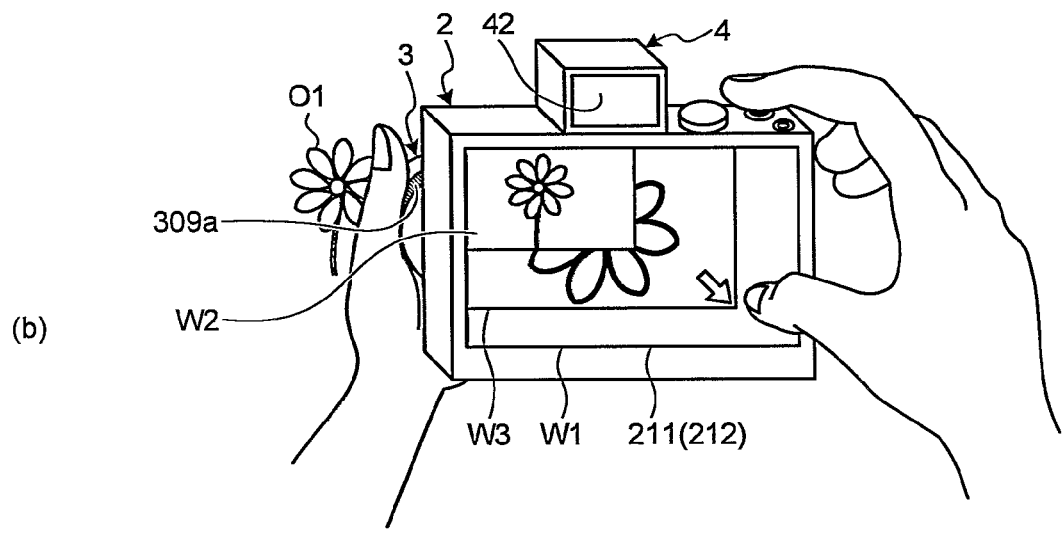
(b)

FIG.32
+
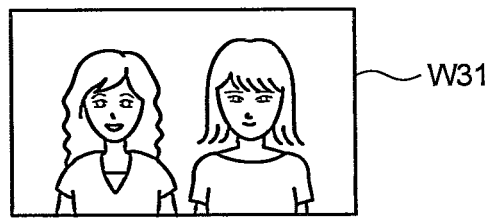
FIG.33
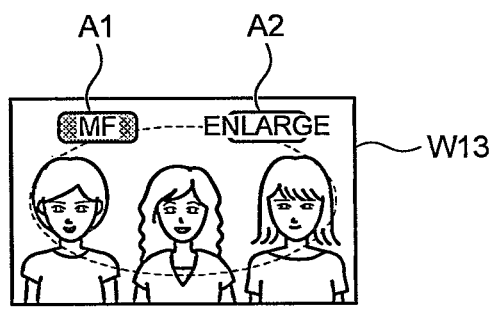

IMAGING APPARATUS, IMAGING METHOD, AND COMPUTER-READABLE STORAGE MEDIUM FOR TRIMMING AND ENLARGING A PORTION OF A SUBJECT IMAGE BASED ON TOUCH PANEL INPUTS

CROSS-REFERENCE TO RELATED APPLICATIONS

This application is based upon and claims the benefit of priority from Japanese Patent Application No. 2011-218185 and Japanese Patent Application No. 2011-218186, filed on Sep. 30, 2011, the entire contents of which are incorporated herein by reference.

BACKGROUND OF THE INVENTION

1. Field of the Invention

The present invention relates to an imaging apparatus, an imaging method, and a program that generate electronic image data by capturing an image of a subject and performing photoelectric conversion thereon.

2. Description of the Related Art

In recent years, imaging apparatuses such as digital cameras are known to have a technique to allow a user to shoot an image while manually adjusting the focus of a lens by allowing the user to operate a manual focus ring while the user sees an image displayed on a display monitor (for example, Japanese Laid-open Patent Publication No. 2011-103681). In this technique, in accordance with a rotating operation of the manual focus ring, an enlarged image obtained by enlarging an area including a focus position by two times is displayed on a live-view image, so that the focus can be manually adjusted in a short time with a higher degree of accuracy.

SUMMARY OF THE INVENTION

An imaging apparatus according to an aspect of the present invention includes: an imaging unit that generates image data of a subject image obtained via a lens unit; a display unit that displays an image corresponding to the image data generated by the imaging unit; an input unit that receives input for specifying an area of a portion of the image displayed by the display unit; and a display controller that controls a display mode for confirming a specified image corresponding to the area of which input is received by the input unit.

An imaging method according to another aspect of the present invention is executed by an imaging apparatus including an imaging unit that generates image data of a subject image obtained via a lens unit, and a display unit that displays an image corresponding to the image data generated by the imaging unit, the imaging method including: receiving input for specifying an area of a portion of the image displayed by the display unit; and controlling a display mode for confirming a specified image corresponding to the area.

A non-transitory computer-readable storage medium according to still another aspect of the present invention has an executable program stored thereon, wherein a processor is provided in an imaging apparatus including an imaging unit that generates image data of a subject image obtained via a lens unit, and a display unit that displays an image corresponding to the image data generated by the imaging unit, and wherein the program instructs a processor to perform: receiving input for specifying an area of a portion of the image displayed by the display unit; and controlling a display mode for confirming a specified image corresponding to the area of which input is received in the input step.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 23 is a figure illustrating an example of an image displayed on the display unit;

FIG. 32 is a figure illustrating an example of two pieces of image data stored in a storage unit by an MR processing unit;

FIG. 33 is a figure illustrating an example of an image displayed by an eyepiece unit;

DETAILED DESCRIPTION OF THE PREFERRED EMBODIMENTS

Figure 1:
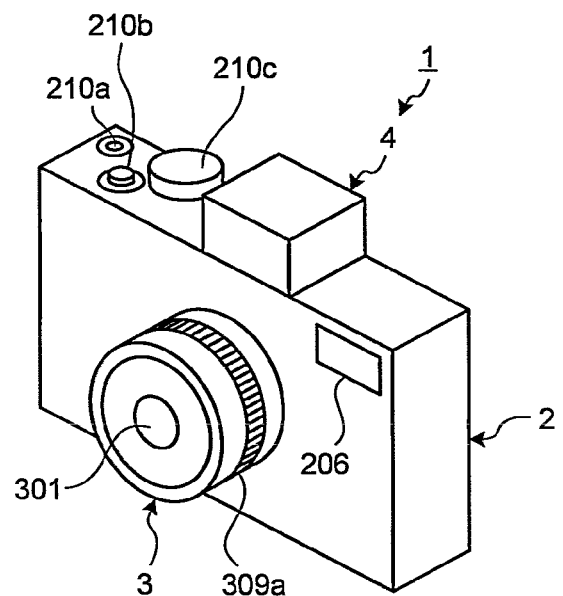
FIG. 1 is a figure illustrating a configuration of a side of an imaging apparatus facing a subject according to a first embodiment of the present invention.

Hereinafter, embodiments for carrying out the present invention (hereinafter referred to as "embodiments") will be explained with reference to drawings. In the explanation below, a digital single-lens reflex camera will be explained as an example of an imaging apparatus according to the present invention, but the present invention is not limited by the embodiments. In the drawings, the same portions are denoted with the same reference numerals and explained.

Figure 2:
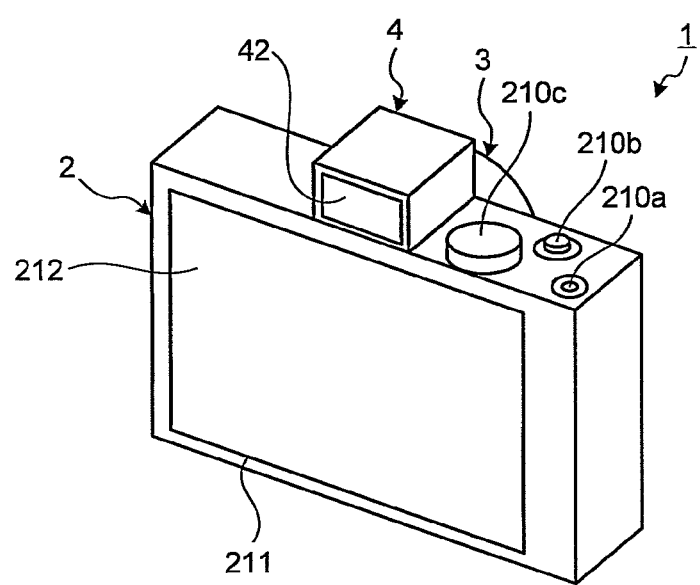
FIG. 2 is a figure illustrating a configuration of a side of the imaging apparatus facing a photographer according to the first embodiment of the present invention.
Figure 3:
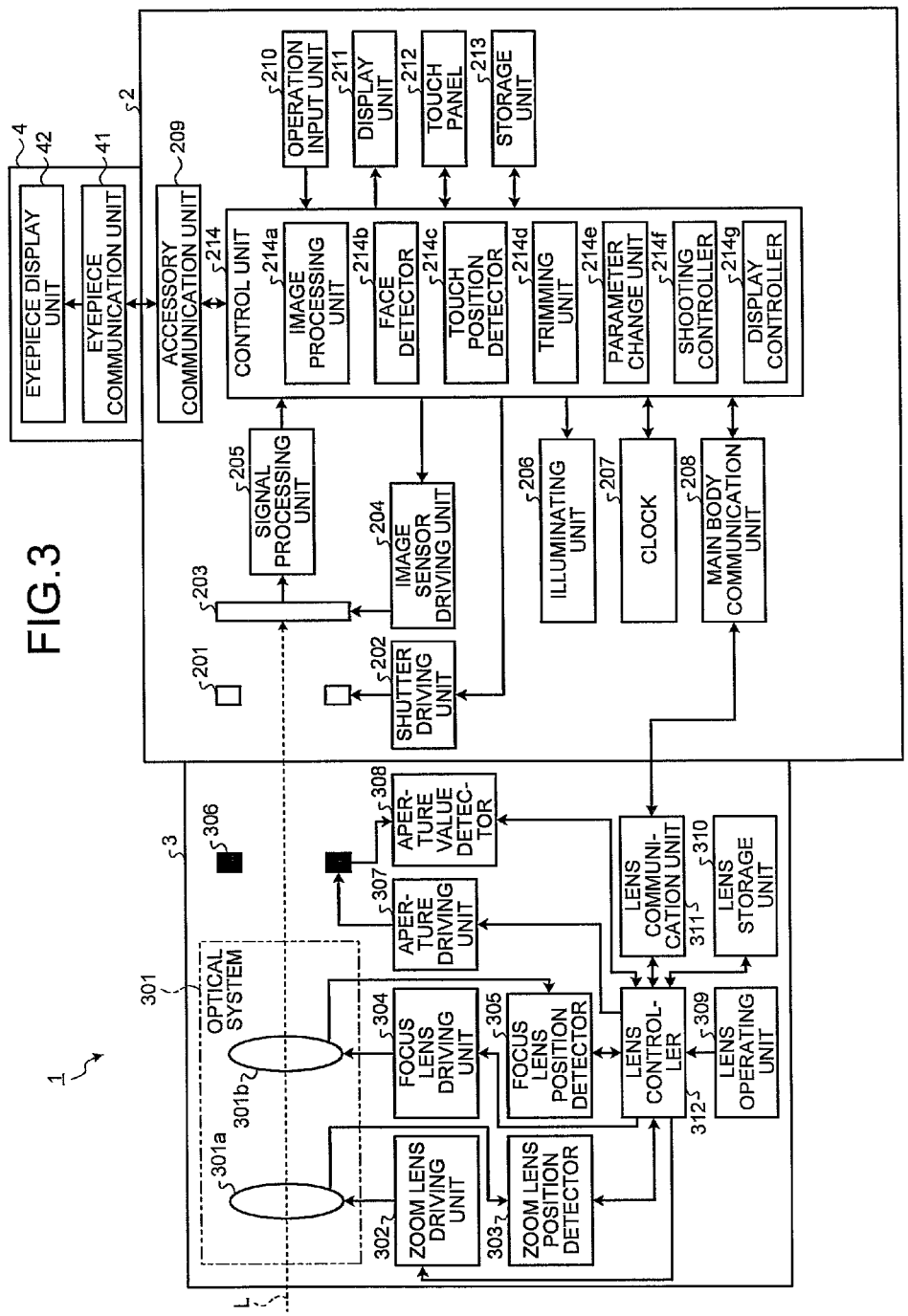
FIG. 3 is a block diagram illustrating the configuration of the imaging apparatus according to the first embodiment of the present invention.

FIG. 1 is a figure illustrating a configuration of a side of the imaging apparatus facing a subject (front surface side) according to the first embodiment of the present invention. FIG. 2 is a figure illustrating a configuration of a side of the imaging apparatus facing a photographer (back surface side) according to the first embodiment of the present invention. FIG. 3 is a block diagram illustrating the configuration of the imaging apparatus according to the first embodiment of the present invention.

As illustrated in FIGS. 1 to 3, an imaging apparatus 1 includes a main body unit 2, a lens unit 3 detachable to the main body unit 2, and an eyepiece unit (electronic view finder) 4 detachable to the main body unit 2.

The main body unit 2 includes a shutter 201, a shutter driving unit 202, an image sensor 203, an image sensor driving unit 204, a signal processing unit 205, an illuminating unit 206, a clock 207, a main body communication unit 208, an accessory communication unit 209, an operation input unit 210, a display unit 211, a touch panel 212, a storage unit 213, a control unit 214.

The shutter 201 performs open/close operation to perform exposure operation for setting the state of the image sensor 203 into either an exposure state or a shielded state. The shutter 201 is made using a mechanical shutter such as a focal plane shutter. The shutter driving unit 202 is made using a stepping motor and the like, and the shutter driving unit 202 drives the shutter 201 in accordance with a command signal which is input from the control unit 214. Alternatively, this may not be provided when the image sensor 203 uses an electronic shutter (for example, rolling shutter method or global shutter method) for controlling an exposure accumulation time.

The image sensor 203 is constituted by a CCD (Charge Coupled Device) or a CMOS (Complementary Metal Oxide Semiconductor) and the like. The image sensor 203 receives light condensed by the lens unit 3, and performs photoelectric conversion, thereby continuously generating image data. The image sensor driving unit 204 causes the image sensor 203 to output image data (analogue signal) to the signal processing unit 205 with predetermined timing.

The signal processing unit 205 performs signal processing such as amplification on image data which are output from the image sensor 203, and thereafter the signal processing unit 205 performs A/D conversion, thus generating digital image data and outputting the generated digital image data to the control unit 214.

The illuminating unit 206 is made using a xenon lamp or an LED (Light Emitting Diode) and the like. The illuminating unit 206 emits stroboscopic light, which is fill light, toward a visual field area of which image is captured by the imaging apparatus 1.

The clock 207 has a time-measuring function and a determination function of a shooting date/time. The clock 207 outputs date/time data to the control unit 214 in order to add the date/time data to the image data captured by the image sensor 203.

The main body communication unit 208 is a communication interface for communicating with a lens unit 3 attached to the main body unit 2. The accessory communication unit 209 is a communication interface for communicating with the eyepiece unit 4 attached to the main body unit 2. It should be noted that the accessory communication unit 209 can communicate not only with the eyepiece unit 4 but also other accessories such as an electronic flash, a GPS receiving device, a microphone, and the like.

As illustrated in FIGS. 1 and 2, the operation input unit 210 includes a power SW 210a for switching the power supply state of the imaging apparatus 1 to ON state or OFF state, a release switch 210b for inputting a release signal for giving commands of still picture shooting or motion picture shooting, and a shooting mode selecting switch 210c for inputting a selection signal for giving commands of various kinds of selections of shooting modes set in the imaging apparatus 1. The release switch 210b can move back and forth according to pressures given from the outside. When the release switch 210b is pressed halfway down, a 1st release signal is input to give a command of shooting preparation operation. In contrast, when the release switch 210b is pressed fully, a 2nd release signal is input to give a command of still picture shooting.

The display unit 211 is made using, e.g., a display panel made of liquid crystal or organic EL (Electro Luminescence). The display unit 211 displays an image corresponding to image data. The display unit 211 displays operation information about operation of the imaging apparatus 1 and shooting information about shooting.

The touch panel 212 is provided on the display screen of the display unit 211. The touch panel 212 detects an external object touching the touch panel 212, and outputs a position signal in accordance with the detected touch position. The touch panel 212 may detect the position touched by the user on the basis of information displayed on the display unit 211, and may receive a command signal for commanding operation performed by the imaging apparatus 1 in accordance with the contact position thus detected. In general, the touch panel 212 uses a resistive film method, a capacitance method, an optical method, and the like. In this first embodiment, a touch panel using any method can be applied. In the first embodiment, the touch panel 212 functions as an input unit.

The storage unit 213 is achieved using semiconductor memory such as flash memory and DRAM (Dynamic Random Access Memory) provided in the imaging apparatus 1 in a fixed manner. The storage unit 213 stores various kinds of programs for causing the imaging apparatus 1 to operate, programs according to this first embodiment, various kinds of data, parameters, and the like used during execution of the programs. The storage unit 213 stores not only the image data but also information about the lens unit 3 that can be attached to the main body unit 2, and information about correction information and the like of image data in accordance with the type of the lens unit 3. It should be noted that the storage unit 213 may include a computer-readable storage medium such as a memory card attached from the outside.

The control unit 214 is made using a CPU (Central Processing Unit) and the like. The control unit 214 centrally controls operation of the imaging apparatus 1 by giving instructions corresponding to units constituting the imaging apparatus 1 and transferring data in accordance with the command signals, the selections signals, and the like given by the operation input unit 210 and the touch panel 212.

The detailed configuration of the control unit 214 will be explained. The control unit 214 includes an image processing unit 214a, a face detector 214b, a touch position detector 214c, a trimming unit 214d, a parameter change unit 214e, a shooting controller 214f, and a display controller 214g.

The image processing unit 214a is made using an image engine (image controller). The image processing unit 214a performs various kinds of image processing on image data which are input from the signal processing unit 205, and outputs the image data to the storage unit 213. More specifically, the image processing unit 214a performs image processing including, at least, gain processing for adjusting brightness of image, gradation correction processing for correcting gradation, edge processing, white balance processing, color correction processing, and γ correction processing on image data. The image processing unit 214a may compress image data in accordance with JPEG (Joint Photographic Experts Group) method, and may store the compressed image data to the storage unit 213.

The face detector 214b detects the face of a person included in the image corresponding to the image data by pattern matching. It should be noted that the face detector 214b may detect not only the face of a person, but also the faces of dogs, cats, and the like. In addition, the face detector 214b may detect the face of a person using a well-known technique other than the pattern matching.

The touch position detector 214c converts the touch position into a position on the image sensor 203 on the basis of the position signal which is input from the touch panel 212. More specifically, when a position signal is input from the touch panel 212, the touch position detector 214c detects a position (coordinate) on the image sensor 203 corresponding to this position signal. The touch position detector 214c also calculates a movement distance of slide operation performed by the user, on the basis of the position signal that changes over time which is input from the touch panel 212.

The trimming unit 214d generates a trimming by cropping an area (hereinafter referred to as "enlarged image") including the touch position touched by the user in a predetermined size and enlarging the area, on the basis of the position signal which is input from the touch panel 212. More specifically, the trimming unit 214d adopts the area including the touch position touched by the user as a target area, on the basis of the position signal which is input from the touch panel 212, and generates an enlarged image of the limited area smaller than the display area of the display unit 211. For example, the trimming unit 214d generates an enlarged image of a size one-third of the size of the display area of the display unit 211. It should be noted that the enlarged image functions as a specified image.

The parameter change unit 214e changes a parameter of a display mode of the enlarged image, on the basis of a command signal and an operation signal which are input from the operation input unit 210, the touch panel 212, or a lens operating unit 309 of the lens unit 3 explained later. In this case, the parameters are considered to be so-called shooting parameters such as the focus state of a subject included in the enlarged image, a display magnification rate of a subject included in the enlarged image (magnification rate), a display size of the enlarged image, and brightness information about the enlarged image. The parameter change unit 214e changes an exposure state and an ISO sensitivity of the enlarged image on the basis of a command signal and an operation signal which are input from the operation input unit 210, the touch panel 212, or the lens operating unit 309 of the lens unit 3 explained later. Further, the parameter change unit 214e changes shooting parameters of the imaging apparatus 1. More specifically, on the basis of a command signal and an operation signal which are input from the touch panel 212, or the lens operating unit 309 of the lens unit 3 explained later, the parameter change unit 214e may estimate shooting parameters such as a zoom magnification rate of the lens unit, an aperture, a focus position, or an exposure time of the imaging apparatus 1, a shutter speed, and an ISO sensitivity, and brightness and image size of an image displayed by the display unit 211, and depending on conditions, and depending on conditions, the parameter change unit 214e may change display parameters such as improvement of visibility during display.

When the shooting controller 214f receives a release signal via the release switch 210b, the shooting controller 214f performs control to start shooting operation in the imaging apparatus 1. In this case, the shooting operation performed by the imaging apparatus 1 means operation in which the signal processing unit 205 and the image processing unit 214a perform predetermined processing on the image data which have been output from the image sensor 203, in accordance with the driving of the shutter driving unit 202 and the image sensor driving unit 204. As described above, the image data on which the processing is performed are stored to the storage unit 213 by the shooting controller 214f.

The display controller 214g causes the display unit 211 and/or an eyepiece display unit 42 to display image corresponding to the image data. More specifically, when the eyepiece display unit 42 is in a state capable of displaying, e.g., when the power supply is set in ON state, the display controller 214g causes the eyepiece display unit 42 to display the live-view image corresponding to the image data, and on the other hand, when the eyepiece display unit 42 is set in OFF state, the display controller 214g causes the display unit 211 to display a live-view image corresponding to the image data. The display controller 214g causes the eyepiece display unit 42 to display an enlarged image generated by the trimming unit 214d. Further, the display controller 214g overlays the enlarged image generated by the trimming unit 214d onto the live-view image and causes the display unit 211 to display the live-view image with the enlarged image overlaid thereon. In addition, the display controller 214g controls the display mode in which the user visually confirms the enlarged image in accordance with the change of the position signal which is output from the touch panel 212. More specifically, the display controller 214g controls an enlarged portion in the enlarged image and the display mode in which the user visually confirms the enlarged portion on the display unit 211 and/or the eyepiece display unit 42.

The main body unit 2 having the above configuration may have a communication function capable of communicating via the Internet with a personal computer (not illustrated) in both ways.

The lens unit 3 includes an optical system 301, a zoom lens driving unit 302, a zoom lens position detector 303, a focus lens driving unit 304, a focus lens position detector 305, an aperture 306, an aperture driving unit 307, an aperture value detector 308, a lens operating unit 309, a lens storage unit 310, a lens communication unit 311, and a lens controller 312.

The optical system 301 condenses light from a predetermined visual field area, and causes the condensed light to form an image on an image-capturing surface of the image sensor 203. The optical system 301 includes a zoom lens 301a and a focus lens 301b. The zoom lens 301a is made using one or a plurality of lens, and moves along an optical axis L, thereby changing the zoom magnification rate of the optical system 301. The focus lens 301b is made using one or a plurality of lens, and moves along the optical axis L, thereby changing the focus position and the focal point distance of the optical system 301.

The zoom lens driving unit 302 is made using a stepping motor, a DC motor, and the like. The zoom lens driving unit 302 causes the zoom lens 301a to move along the optical axis L under the control of the lens controller 312.

The zoom lens position detector 303 is made using a photointerrupter and the like. The zoom lens position detector 303 detects the position of the zoom lens 301a driven by the zoom lens driving unit 302. More specifically, the zoom lens position detector 303 converts the amount of rotation of the driving motor included in the zoom lens driving unit 302 into the number of pulses, and detects, on the basis of the number of pulses thus converted, the position of the zoom lens 301a from the reference position on the optical axis L with the infinite point being the reference.

The focus lens driving unit 304 is made using a stepping motor, a DC motor, and the like. The focus lens driving unit 304 moves the focus lens 301b along the optical axis L under the control of the lens controller 312.

The focus lens position detector 305 is made using a photointerrupter and the like. The focus lens position detector 305 detects the position of the focus lens driven by the focus lens driving unit. Using the same method as the zoom lens position detector 303, the focus lens position detector 305 detects the position of the focus lens 301b on the optical axis L.

The aperture 306 adjusts the exposure by limiting the amount of incident light condensed by the optical system 301. The aperture driving unit 307 is made using a stepping motor and the like, and under the control of the lens controller 312, the aperture driving unit 307 drives the aperture 306, thereby adjusting the amount of light incident upon the image sensor 203.

The aperture value detector 308 detects the state of the aperture 306 driven by the aperture driving unit 307, thereby detecting an f number of the aperture 306. The aperture value detector 308 is made using, e.g., an A/D conversion circuit and a potentiometer such as a linear encoder and a variable resistive element.

As illustrated in FIG. 1, the lens operating unit 309 is a ring 309a and the like provided around a lens barrel of the lens unit 3, and inputs a command signal for commanding operation of the imaging apparatus 1 or operation of the zoom lens 301a and the focus lens 301b in the optical system 301. It should be noted that the lens operating unit 309 may be a push switch and the like.

The lens storage unit 310 stores a control program for determining the positions and the movements of the optical system 301 and the aperture 306. The lens storage unit 310 stores a magnification rate, a focal point distance, view angle, aberration, and F value (brightness), and the like of the optical system 301.

The lens communication unit 311 is a communication interface for communicating with the main body communication unit 208 of the main body unit 2 when the lens unit 3 is attached to the main body unit 2.

The lens controller 312 is made using a CPU and the like. The lens controller 312 controls operation of the lens unit 3 in accordance with a command signal and a driving signal which are input from the control unit 214 via the main body communication unit 208 and the lens communication unit 311. In synchronization with timing according to which the image sensor 203 generates image data, the lens controller 312 outputs the position of the zoom lens 301a detected by the zoom lens position detector 303, the position of the focus lens 301b detected by the focus lens position detector 305, and the aperture value of the aperture 306 detected by the aperture value detector 308 to the control unit 214 via the main body communication unit 208 and the lens communication unit 311.

The eyepiece unit 4 displays a display screen which the user can recognize when the eyes of the user are in proximity to the eyepiece unit 4. The eyepiece unit 4 displays a live-view image corresponding to the image data generated by the image sensor 203, and the display area of the live-view image is smaller than the display area of the display unit 211. The eyepiece unit 4 includes an eyepiece communication unit 41 and an eyepiece display unit 42.

When the eyepiece unit 4 is attached to the main body unit 2, the eyepiece communication unit 41 is an interface for communicating with the accessory communication unit 209 of the main body unit 2.

The eyepiece display unit 42 is achieved using a display panel made of liquid crystal, organic EL (Electro Luminescence), or the like. The eyepiece display unit 42 displays a live-view image corresponding to image data. In the eyepiece display unit 42, the display area of the live-view image is smaller than the display area of the display unit 211. The eyepiece display unit 42 overlays operation information about the imaging apparatus 1 or the shooting information about the shooting situation onto the live-view image and displays the live-view image with the operation information about the imaging apparatus 1 or the shooting information about the shooting situation overlaid thereon. The eyepiece display unit 42 allows the user to confirm the live-view image when the eyes of the user are in proximity to the eyepiece display unit 42. Under the control of the display controller 214g, the eyepiece display unit 42 displays an enlarged image corresponding to enlarged image data generated by the trimming unit 214d continuously.

Figure 4:
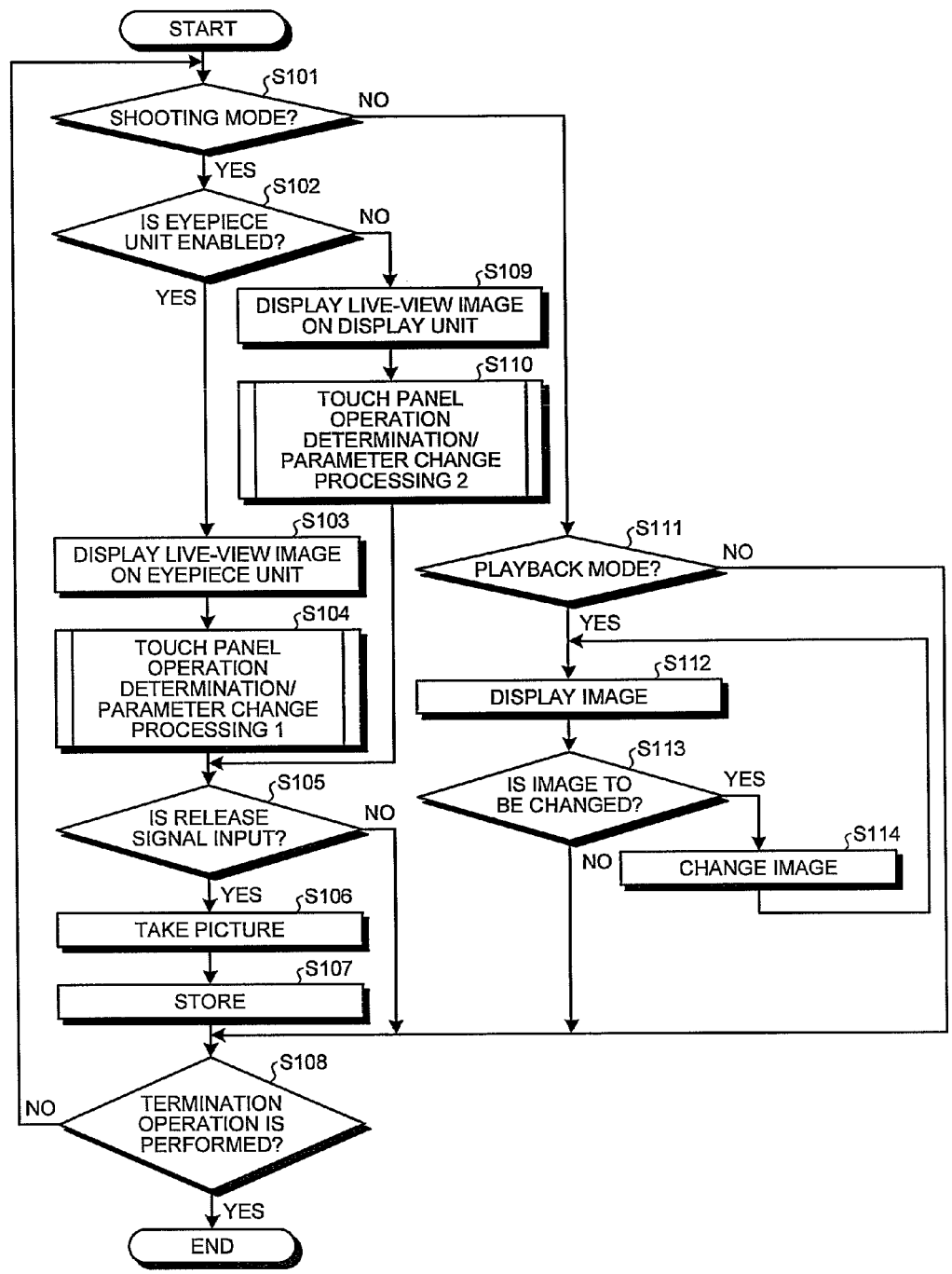
FIG. 4 is a flowchart illustrating processing performed by the imaging apparatus according to the first embodiment of the present invention.

Operation performed by the imaging apparatus 1 having the above configuration will be explained. FIG. 4 is a flowchart illustrating processing performed by the imaging apparatus 1.

As illustrated in FIG. 4, a case where the imaging apparatus 1 is set in shooting mode (step S101: Yes) will be explained. In this case, the control unit 214 determines whether the eyepiece unit 4 is enabled or not (step S102). More specifically, the control unit 214 determines whether the eyepiece unit 4 is enabled or not by determining whether a power SW (not illustrated) of the eyepiece unit 4 is in ON state or whether the user touches the contact sensor (not illustrated) which causes a contact sensor to output a detection signal. When the control unit 214 determines that the eyepiece unit 4 is enabled (step S102: Yes), the imaging apparatus 1 proceeds to step S103 explained later. On the other hand, when the control unit 214 determines that the eyepiece unit 4 is not enabled (step S102: No), the imaging apparatus 1 proceeds to step S109 explained later.

In step S103, the display controller 214g causes each of the eyepiece display unit 42 and the display unit 211 to successively display live-view images corresponding to image data continuously generated by the image sensor 203.

Subsequently, the imaging apparatus 1 determines touch operation performed on the touch panel 212, and based on this determination result, the imaging apparatus 1 executes touch panel operation determination/parameter change processing 1 to change parameters of a display image displayed by the eyepiece unit 4 and the shooting condition of the imaging apparatus 1 (step S104). The details of the touch panel operation determination/parameter change processing 1 will be explained later.

Thereafter, when a 2nd release signal is input from the release switch 210b (step S105: Yes), the shooting controller 214f performs still picture shooting (step S106), and captured image data are stored to the storage unit 213 (step S107).

Subsequently, the control unit 214 determines whether termination operation is performed or not (step S108). More specifically, when the power SW 210a is operated, the control unit 214 determines whether the power supply of the imaging apparatus 1 is in OFF state or not, thereby determining whether termination operation is performed or not. When the control unit 214 determines that the termination operation has been performed (step S108: Yes), this processing is terminated. On the other hand, when the control unit 214 determines that the termination operation has not yet been performed (step S108: No), the imaging apparatus 1 returns back to step S101.

When the control unit 214 determines that the 2nd release signal has not yet been input via the release switch 210b in step S105 (step S105: No), the imaging apparatus 1 proceeds to step S108.

In step S109, the display controller 214g causes the display unit 211 to successively display live-view images corresponding to image data continuously generated by the image sensor 203.

Subsequently, the imaging apparatus 1 determines touch operation performed on the touch panel 212, and based on this determination result, the imaging apparatus 1 executes touch panel operation determination/parameter change processing 2 to change parameters of a display image displayed by the display unit 211 and the shooting condition of the imaging apparatus 1 (step S110). The details of the touch panel operation determination/parameter change processing 2 will be explained later. Thereafter, the imaging apparatus 1 proceeds to step S105.

Subsequently, a case where the imaging apparatus 1 is not set in the shooting mode (step S101: No) will be explained. In this case, the control unit 214 determines whether the imaging apparatus 1 is set in a playback mode for playing back image data stored in the storage unit 213. When the control unit 214 determines that the imaging apparatus 1 is set in the playback mode (step S111: Yes), the imaging apparatus 1 proceeds to step S112. On the other hand, when the control unit 214 determines that the imaging apparatus 1 is not set in the playback mode (step S111: No), the imaging apparatus 1 proceeds to step S108.

Subsequently, the display controller 214g causes the display unit 211 to display an image corresponding to image data stored in the storage unit 213 (step S112).

Thereafter, when a selection signal for commanding change of an image is input from a selection switch (not illustrated) (step S113: Yes), the display controller 214g changes the image displayed by the display unit 211 (step S114). After step S114, the imaging apparatus 1 returns back to step S112. On the other hand, when the selection signal is not input (step S113: No), the imaging apparatus 1 proceeds to step S108.

Subsequently, the touch panel operation determination/parameter change processing 1 explained in step S104 of FIG. 4 will be explained. In the explanation below, first, overview of the touch panel operation determination/parameter change processing 1 according to this first embodiment will be explained. Thereafter, the touch panel operation determination/parameter change processing 1 will be explained in detail.

Figure 5:
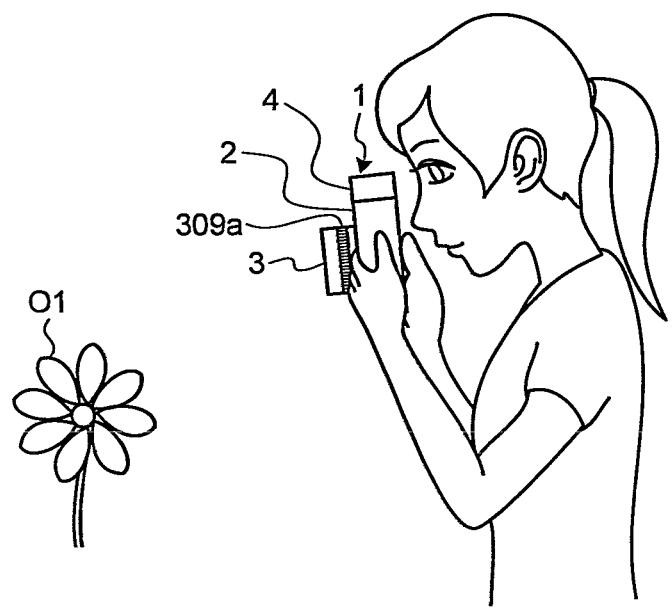
FIG. 5 is a figure illustrating a situation where a user takes a picture while confirming a focus state concerning a subject using an eyepiece unit.
Figure 6:
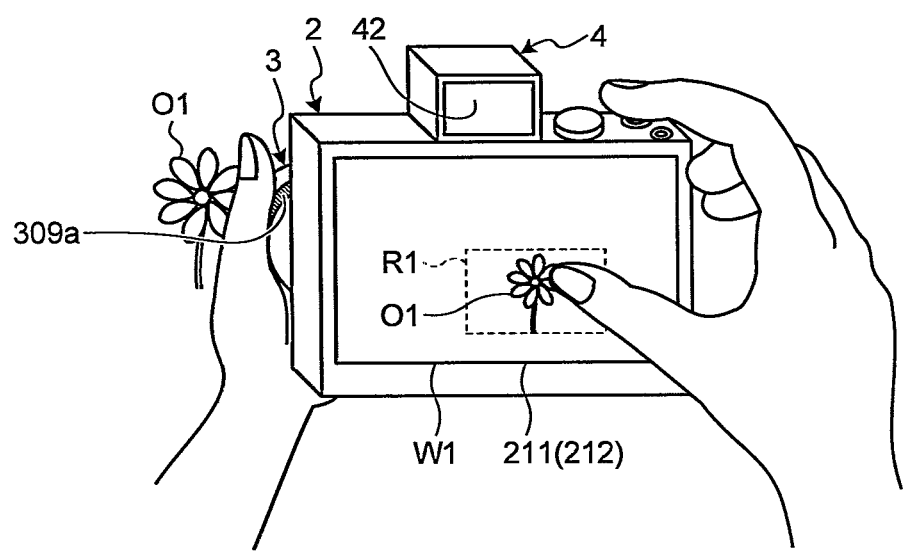
FIG. 6 is a figure schematically illustrating a situation where, under the situation as illustrated in FIG. 5, the user touches a desired subject within a live-view image displayed on a display unit.
Figure 7:
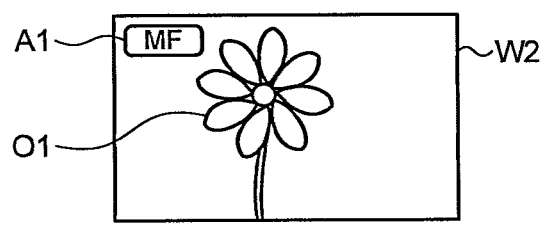
FIG. 7 is a figure illustrating an example of an image displayed continuously by the eyepiece unit under the situation as illustrated in FIG. 5.

FIG. 5 is a figure illustrating a situation where a user takes a picture while confirming a focus state concerning a subject O1 (flower) using the eyepiece unit 4. FIG. 6 is a figure schematically illustrating a situation where, under the situation as illustrated in FIG. 5, the user touches the desired subject O1 within the live-view image displayed on the display unit 211. FIG. 7 is a figure illustrating an example of an image displayed continuously by the eyepiece unit 4 under the situation as illustrated in FIG. 5.

As illustrated in FIGS. 5 and 6, in order to prevent handshake and keep the state of holding the main body unit 2 and the lens unit 3 of the imaging apparatus 1, the user wants to perform required shooting operation quickly and easily, e.g., the user wants to confirm the focus state of the subject O1 and focus change operation of the lens unit 3, without moving fingers and hands as much as possible. Moreover, as illustrated in FIG. 6, in many cases, an area on the touch panel 212 which can be touched with a thumb is small, and the user is likely to look into the eyepiece unit 4 without seeing the display unit 211. Accordingly, in the touch panel operation determination/parameter change processing 1 according to this first embodiment, an area that can be operated with a right thumb in the state in which the user holds the imaging apparatus 1 may be set as an effective area of the touch panel 212. It is to be understood that control may be performed for allowing direct touch.

The user also wants to confirm the focus state of the subject O1 while holding the lens unit 3 with his/her left hand while placing the index finger of the right hand on the release switch 210b. Accordingly, in the touch panel operation determination/parameter change processing 1 according to this first embodiment, when the user touches the subject O1 in a live-view image W1 displayed on the display unit 211 using the touch panel 212 with the thumb of the right hand so that the user can confirm the focus state of the subject O1 on the eyepiece display unit 42 of the eyepiece unit 4, the trimming unit 214d crops a target area R1 including the touch position and generates an enlarged image W2, and then, the display controller 214g causes the eyepiece display unit 42 to display the enlarged image W2 which is to be confirmed by the user (FIG. 7). Thereafter, in accordance with operation performed with the ring 309a, the parameter change unit 214e drives the focus lens driving unit 304 via the lens controller 312, thereby changing the focus of the lens unit 3 concerning the subject O1 included in the live-view image W1 and the enlarged image W2. In FIGS. 5 to 7, the focus state concerning the subject O1 is adjusted. Alternatively, the user may adjust enlargement or reduction of the subject O1 by operating the ring 309a. In this case, in response to the operation performed with the ring 309a, the parameter change unit 214e drives the zoom lens driving unit 302 drives the zoom lens driving unit 302 via the lens controller 312, thereby changing the magnification rate concerning the subject O1 included in the live-view image W1 and the enlarged image W2. In addition, in FIG. 7, the display controller 214g may cause the display unit 211 to display an icon indicating enlargement or reduction process as information about a shooting parameter of the imaging apparatus 1.

As described above, in the touch panel operation determination/parameter change processing 1 according to this first embodiment, the user operates the ring 309a while confirming the focus of the subject O1 which is difficult to be done by means of visual observation while maintaining the state of holding the imaging apparatus 1, and this allows the user to easily change the focus position of the lens unit 3 concerning the subject O1. In this first embodiment, the effective area can be set appropriately. Further, in the enlarged image W2 of FIG. 7, the display controller 214g may cause the eyepiece display unit 42 to display an icon A1 as information about the shooting mode of the imaging apparatus 1. The icon A1 is an icon indicating that the imaging apparatus 1 is set in the manual focus mode. Further, the display controller 214g may change the brightness as, e.g., a parameter of the display mode, in which the user makes visual observation, of the enlarged image W2. Accordingly, the enlarged image W2 and the live-view image can be confirmed as being distinguished from each other.

Figure 8:
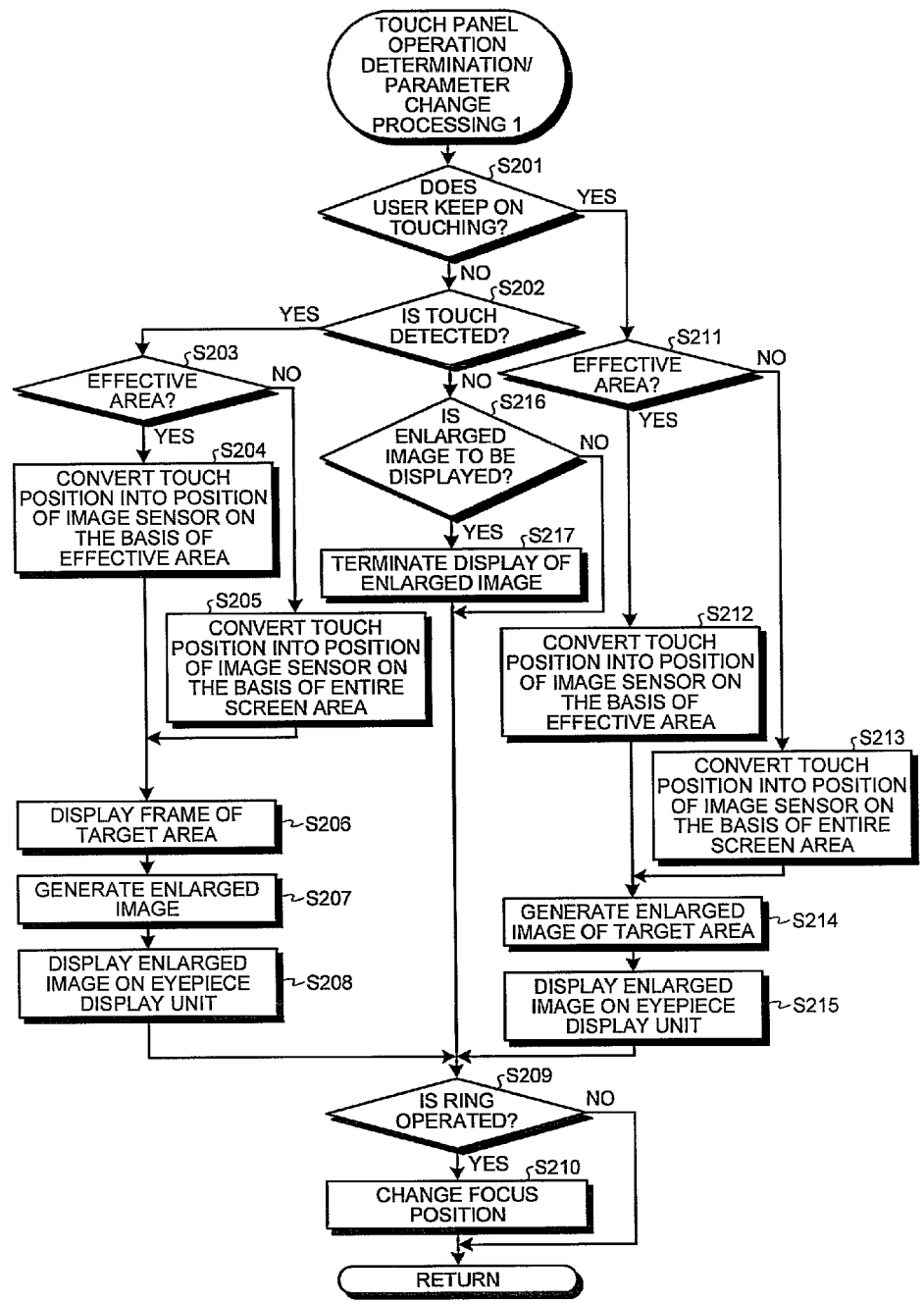
FIG. 8 is a flowchart illustrating overview of touch panel operation determination/parameter change processing 1 according to the first embodiment of the present invention.

FIG. 8 is a flowchart illustrating overview of touch panel operation determination/parameter change processing 1.

As illustrated in FIG. 8, the control unit 214 determines whether the user keeps on touching the touch panel 212 or not (step S201). More specifically, the control unit 214 determines whether a position signal is output from the touch panel 212, thereby determining whether the user keeps on touching the touch panel 212. When the control unit 214 determines that the user keeps on touching the touch panel 212 (step S201: Yes), the imaging apparatus 1 proceeds to step S211 explained later. On the other hand, when the control unit 214 determines that the user does not keep on touching the touch panel 212 (step S201: No), the imaging apparatus 1 proceeds to step S202 explained later.

In step S202, the control unit 214 determines whether the touch panel 212 has detected touch operation or not. More specifically, the control unit 214 determines whether a position signal is output from the touch panel 212 or not. When the control unit 214 determines that the touch panel 212 has detected touch operation (step S202: Yes), the imaging apparatus 1 proceeds to step S203 explained later. On the other hand, when the control unit 214 determines that the touch panel 212 has not detected touch operation (step S202: No), the imaging apparatus 1 proceeds to step S216 explained later.

In step S203, the control unit 214 determines whether the touch position of the touch panel 212 touched by the user is in the effective area (see FIG. 6) or not. When the control unit 214 determines that the touch position of the touch panel 212 touched by the user is in the effective area (step S203: Yes), the imaging apparatus 1 proceeds to step S204. On the other hand, when the control unit 214 determines that the touch position of the touch panel 212 touched by the user is not in the effective area (step S203: No), the imaging apparatus 1 proceeds to step S205.

In step S204, the touch position detector 214c converts the touch position of the effective area of the touch panel 212 touched by the user into a position (coordinate) of the image sensor 203.

Figure 9:
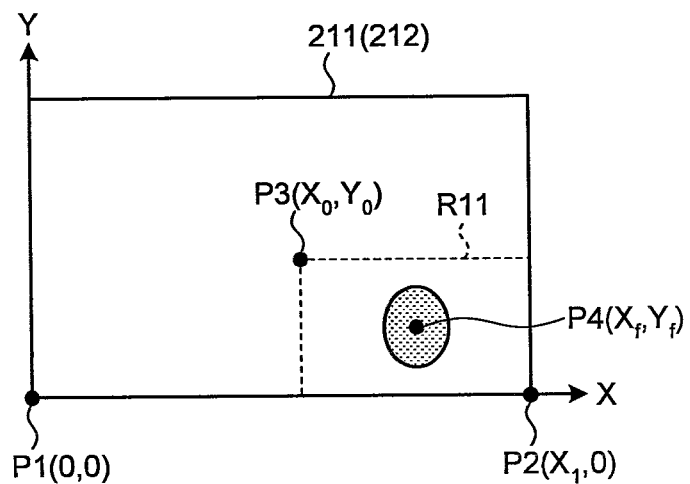
FIG. 9 is a figure schematically illustrating a conversion method when a touch position detector converts a touch position in an effective area of a touch panel into a position of the image sensor.

FIG. 9 is a figure schematically illustrating a conversion method when the touch position detector 214c converts a touch position in the effective area of the touch panel 212 into a position of the image sensor 203. In FIG. 9, a coordinate system is considered in which a lower left point of the touch panel 212 is denoted as an origin point P1, a horizontal direction of the touch panel 212 is denoted as an X-axis, and a vertical direction of the touch panel 212 is denoted as a Y-axis. In the image-capturing area of the image sensor 203, a coordinate system is considered in which a lower left point is denoted as an origin point, and a horizontal direction of the image sensor 203 is denoted as an X-axis, and a vertical direction of the image sensor 203 is denoted as a Y-axis.

As illustrated in FIG. 9, the coordinate of a point P2 at the lower right of the touch panel 212 is denoted as $(X_1, 0)$, the coordinate of a point P3 at the upper left of the effective area R11 is denoted as $(X_0, Y_0)$, the coordinate of a touch position P4 is denoted as $(X_f, Y_f)$, and a point at the upper right of the image-capturing area of the image sensor 203 is denoted as $(X_{i1}, Y_{i1})$. In this case, the touch position detector 214c uses the following expression to convert the touch position into a position $(X_{if}, Y_{if})$ on the image sensor 203.

$$X_f : X_{if} = (X_1 - X_0) : X_{i1} \tag{1}$$

Therefore, the following expression is obtained.

$$X_{if} = X_{i1} \times X_f / (X_1 - X_0) \tag{2}$$

Likewise, the following expression holds.

$$Y_f : Y_{if} = Y_0 : Y_{i1} \tag{3}$$

Therefore, the following expression is obtained.

$$Y_{if} = Y_{i1} \times (Y_f / Y_0) \tag{4}$$

As described above, the touch position detector 214c uses the expression (2) and the expression (4) to convert the touch position of the effective area R11 of the touch panel 212 touched by the user into the position (coordinate) of the image sensor 203.

Back to FIG. 8, in step S205, the touch position detector 214c converts the touch position of the touch panel 212 touched by the user into the position on the image sensor 203.

Figure 10:
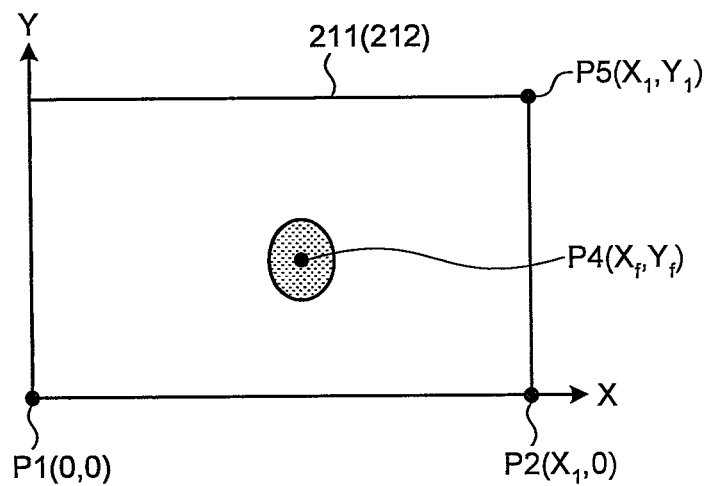
FIG. 10 is a figure schematically illustrating a conversion method when the touch position detector converts the touch position of the touch panel into a position on the image sensor.

FIG. 10 is a figure schematically illustrating a conversion method when the touch position detector 214c converts the touch position of the touch panel 212 into a position on the image sensor 203. In FIG. 10, a coordinate system is considered in which the lower left point of the touch panel 212 is denoted as an origin point P1, a horizontal direction of the touch panel 212 is denoted as an X-axis, and a vertical direction of the touch panel is denoted as a Y-axis. A coordinate system is considered in which the lower left point of the image sensor 203 is denoted as an origin point, a horizontal direction of the image sensor 203 is an X-axis, and a vertical direction of the image sensor 203 is denoted as a Y-axis.

As illustrated in FIG. 10, the coordinate of the point P2 at the lower right of the touch panel 212 is denoted as $(X_1, 0)$, the coordinate of a point P5 at the upper right of the touch panel 212 is denoted as $(X_1, Y_1)$, the coordinate of the touch position P4 is denoted as $(X_f, Y_f)$, and a point at the upper right of the image sensor 203 is denoted as $(X_{i1}, Y_{i1})$. In this case, the touch position detector 214c uses the following expression to convert the touch position into a position $(X_{if}, Y_{if})$ on the image sensor 203.

$$X_f : X_{if} = X_1 : X_{i1} \quad (5)$$

Therefore, the following expression is obtained.

$$X_{if} = X_{i1} \times (X_f / X_1) \quad (6)$$

Likewise, the following expression holds.

$$Y_f : Y_{if} = Y_1 : Y_{i1} \quad (7)$$

Therefore, the following expression is obtained.

$$Y_{if} = Y_{i1} \times (Y_f / Y_1) \quad (8)$$

As described above, the touch position detector 214c uses the expression (6) and the expression (8) to convert the touch position of the touch panel 212 touched by the user into the position (coordinate) of the image sensor 203.

Back to FIG. 8, in step S206, the display controller 214g causes the display unit 211 to display a frame of a target area, on the basis of the position converted by the touch position detector 214c. More specifically, as illustrated in FIG. 6, the display controller 214g causes the display unit 211 to display a frame R1 corresponding to the target area including the converted position converted by the touch position detector 214c. This enables the user to intuitively understand the touch area touched by the user.

Subsequently, the trimming unit 214d crops the target area R1 out of the live-view image, thereby generating an enlarged image (step S207).

Thereafter, the display controller 214g causes the eyepiece display unit 42 to display the enlarged image generated by the trimming unit 214d (step S208).

Subsequently, the control unit 214 determines whether the user operates the ring 309a or not (step S209). More specifically, the control unit 214 determines whether the user performs operation to rotate the ring 309a to either left or right and accordingly the ring 309a inputs a command signal for commanding change of the focus position and/or focus distance of the lens unit 3. When the control unit 214 determines that the user operates the ring 309a (step S209: Yes), the imaging apparatus 1 proceeds to step S210. On the other hand, when the control unit 214 determines that the user does not operate the ring 309a (step S209: No), the imaging apparatus 1 returns back to the main routine of FIG. 4.

In step S210, on the basis of the command signal which is input from the ring 309a, the parameter change unit 214e changes the focus position of the lens unit 3. More specifically, on the basis of the command signal which is input from the ring 309a, the parameter change unit 214e causes the lens controller 312, by way of the main body communication unit 208 and the lens communication unit 311, to drive the focus lens driving unit 304 and move the focus lens 301b along the optical axis L, thereby outputting a driving signal for changing the focus position of the lens unit 3. Accordingly, the focus state of the subject included in the enlarged image is changed, whereby the focus state desired by the user is attained. It should be noted that the focus position includes the focus position and the focal distance of the lens unit 3. Thereafter, the imaging apparatus 1 returns back to the main routine of FIG. 4.

In step S211, the control unit 214 determines whether the touch position of the touch panel 212 touched by the user is in the effective area or not. When the control unit 214 determines that the touch position of the touch panel 212 touched by the user is in the effective area (step S211: Yes), the imaging apparatus 1 proceeds to step S212. On the other hand, when the control unit 214 determines that the touch position of the touch panel 212 touched by the user is not in the effective area (step S211: No), the imaging apparatus 1 proceeds to step S213.

Steps S212 and S213 correspond to steps S204 and S205 explained above, respectively.

Subsequently, on the basis of the converted position converted by the touch position detector 214c, the trimming unit 214d generates an enlarged image obtained by cropping the target area including the touch position from the live-view image and enlarging the cropped target area (step S214).

Thereafter, the display controller 214g causes the eyepiece display unit 42 to display the enlarged image generated by the trimming unit 214d (step S215). Accordingly, as illustrated in FIGS. 5 to 7, the user operates the ring 309a of the lens unit 3 with the left hand while still placing the index finger of the right hand on the release switch 210b, and the user can quickly and easily adjust the focus of the lens unit 3 concerning the desired subject O1 while confirming the enlarged image W2 on the eyepiece display unit 42 of the eyepiece unit 4. After step S215, the imaging apparatus 1 proceeds to step S209.

In step S216, the control unit 214 determines whether the eyepiece display unit 42 displays the enlarged image continuously generated by the trimming unit 214d. When the control unit 214 determines that the eyepiece display unit 42 displays the enlarged image continuously generated by the trimming unit 214d (step S216: Yes), the imaging apparatus 1 proceeds to step S217. On the other hand, when the control unit 214 determines that the eyepiece display unit 42 displays the enlarged image continuously generated by the trimming unit 214d (step S216: No), the imaging apparatus 1 proceeds to step S209.

In step S217, the display controller 214g terminates the display of the enlarged image displayed by the eyepiece display unit 42. Thereafter, the imaging apparatus 1 proceeds to step S209.

Subsequently, touch panel operation determination/parameter change processing 2 in step S110 of FIG. 4 will be explained. In the explanation below, first, overview of the touch panel operation determination/parameter change processing 2 according to this first embodiment will be explained. Thereafter, the touch panel operation determination/parameter change processing 2 will be explained in detail.

Figure 11:
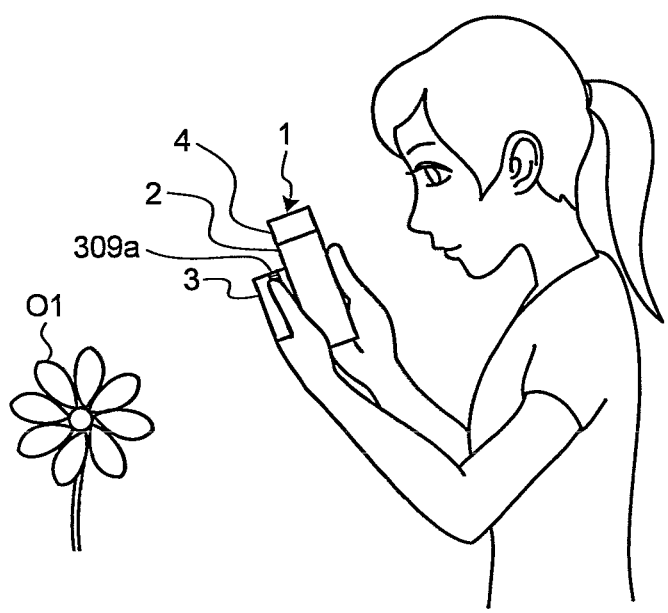
FIG. 11 is a figure illustrating a situation where the user takes a picture while the user confirms a focus state concerning a subject using the display unit.
Figure 12:
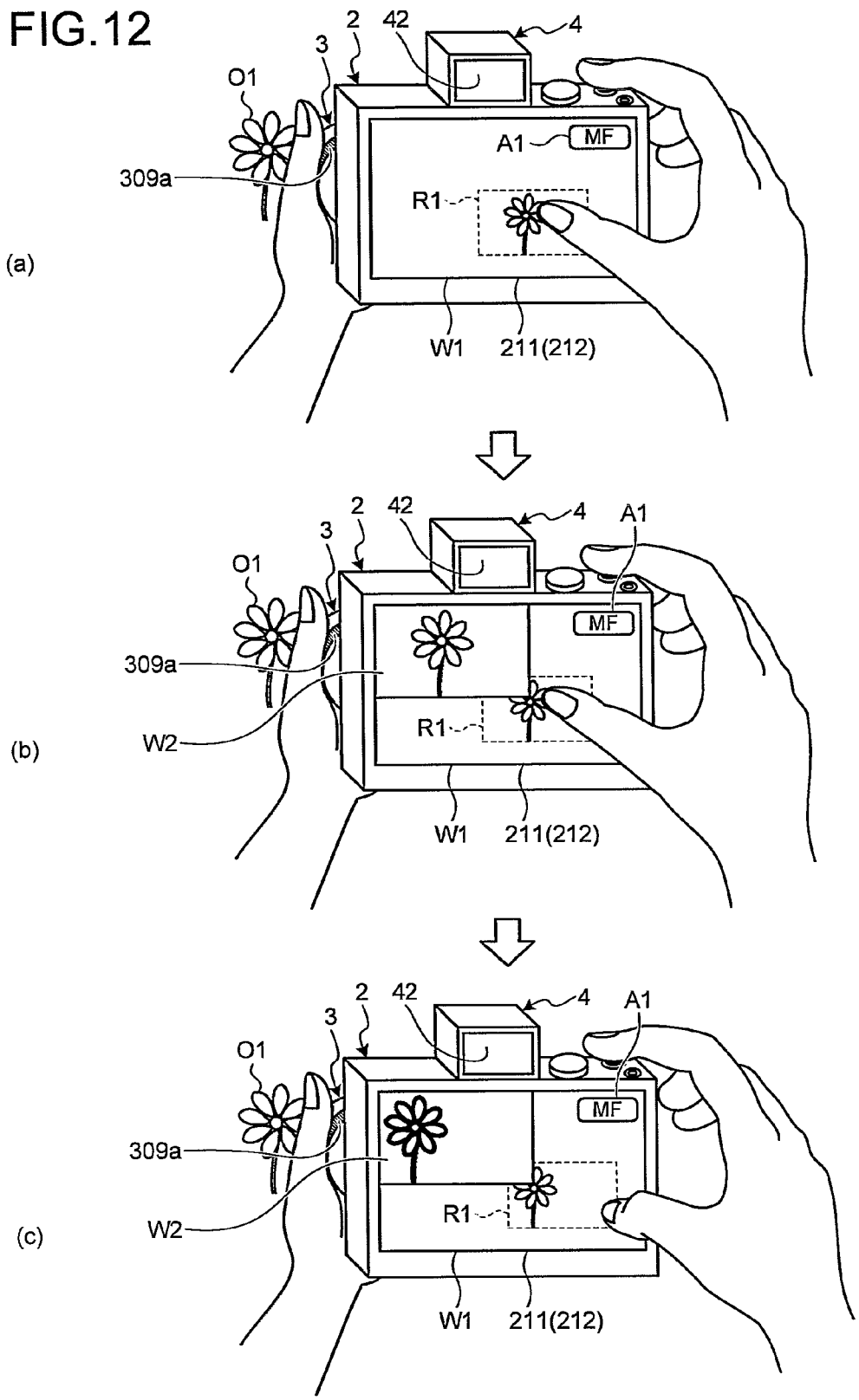
FIG. 12 is a figure schematically illustrating a situation where a desired subject is touched within the live-view image displayed on the display unit under the situation as illustrated in FIG. 11.

FIG. 11 is a figure illustrating a situation where the user takes a picture while the user confirms the focus state concerning the subject O1 using the display unit 211. FIG. 12 is a figure schematically illustrating a situation where a desired subject O1 is touched within the live-view image displayed on the display unit 211 under the situation as illustrated in FIG. 11.

As illustrated in FIGS. 11 and 12, the user wants to confirm the focus state concerning the subject O1 while holding the lens unit 3 with the left hand while placing the index finger of the right hand on the release switch 210b. Accordingly, in the touch panel operation determination/parameter change processing 2 according to this first embodiment, when the user touches, with the thumb of the right hand by means of the touch panel 212, the subject O1 of the live-view image W1 displayed on the display unit 211 (see FIG. 12(a)), the trimming unit 214d crops the target area R1 including the touch position to make the enlarged image W2, and the display controller 214g causes the enlarged image W2 to be displayed on the upper left screen of the display unit 211 (FIG. 12(b)), so that the user can confirm the focus state of the subject O1 on the display unit 211. Thereafter, in accordance with operation performed with the ring 309a, the parameter change unit 214e changes the focus of the lens unit 3 concerning the subject O1 appearing in the live-view image W1 (FIG. 12(c)). Accordingly, the focus state of the subject O1 included in the enlarged image W2 can be changed. It should be noted that, in accordance with operation performed with the ring 309a, the parameter change unit 214e may also change the magnification rate of the subject O1 appearing in the enlarged image W2 or the live-view image W1.

As described above, in the touch panel operation determination/parameter change processing 2 according to this first embodiment, the user operates the ring 309a while confirming the focus state of the subject O1 which is difficult to be done by means of visual observation while maintaining the state of holding the imaging apparatus 1, and this allows the user to easily change the focus position of the lens unit 3 concerning the subject O1. Moreover, the user does not hide the touched portion because the display position of the enlarged image W2 is displayed at the position that is not covered by the user's right hand. It should be noted that the display position of the enlarged image can be set as necessary. Further, the display controller 214g may cause the display unit 211 to display the icon A1 as information about the shooting mode of the imaging apparatus 1. The icon A1 represents an icon indicating that the imaging apparatus 1 is set in the manual focus mode.

Figure 13:
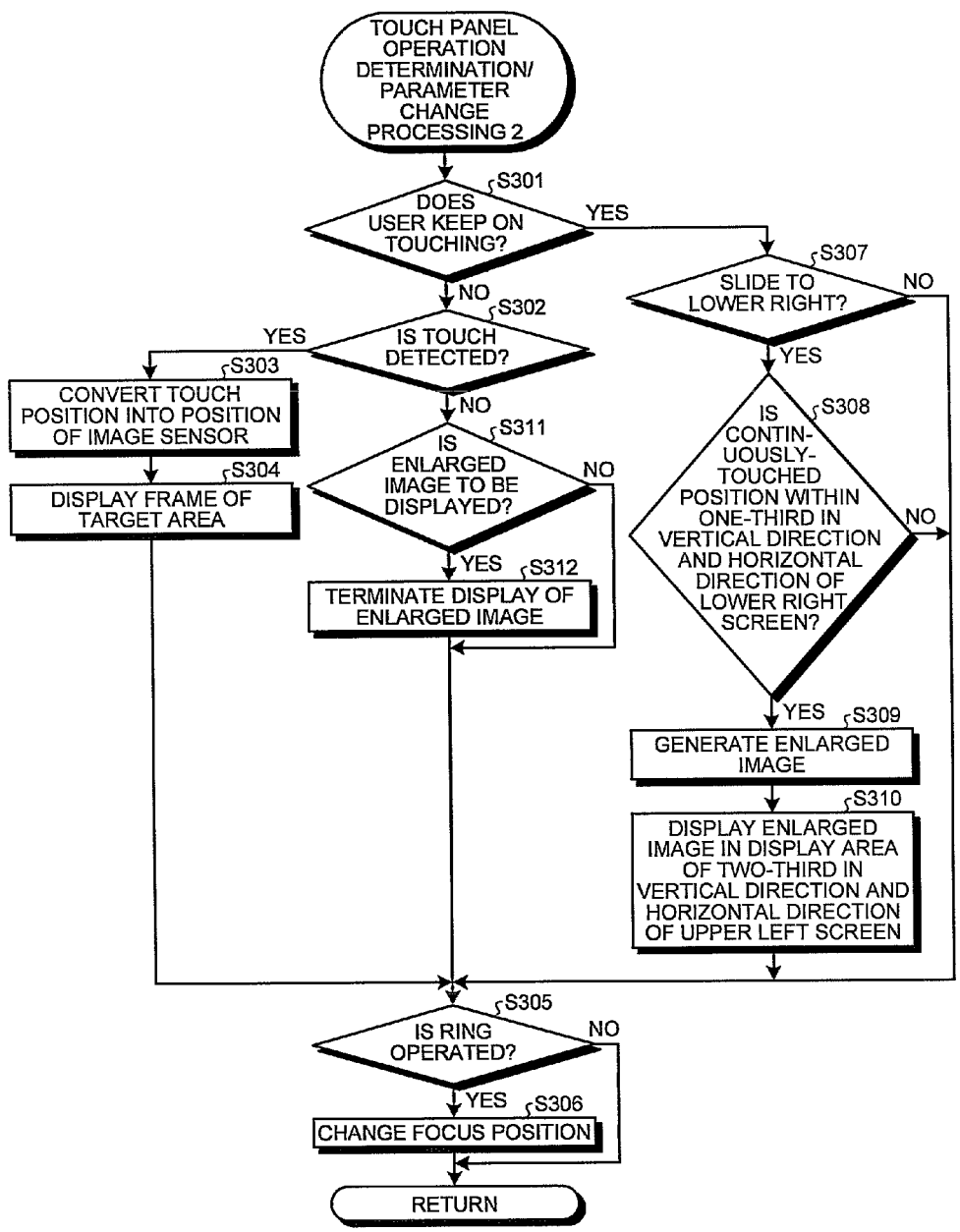
FIG. 13 is a flowchart illustrating overview of touch panel operation determination/parameter change processing 2 according to the first embodiment of the present invention.

FIG. 13 is a flowchart illustrating overview of the touch panel operation determination/parameter change processing 2.

As illustrated in FIG. 13, the control unit 214 determines whether the user keeps on touching the touch panel 212 or not (step S301). When the control unit 214 determines that the user keeps on touching the touch panel 212 (step S301: Yes), the imaging apparatus 1 proceeds to step S307 explained later. On the other hand, when the control unit 214 determines that the user does not keep on touching the touch panel 212 (step S301: No), the imaging apparatus 1 proceeds to step S302 explained later.

In step S302, the control unit 214 determines whether the touch panel 212 has detected touch operation or not. When the control unit 214 determines that the touch panel 212 has detected touch operation (step S302: Yes), the imaging apparatus 1 proceeds to step S303 explained later. On the other hand, when the control unit 214 determines that the touch panel 212 has not detected touch operation (step S302: No), the imaging apparatus 1 proceeds to step S311 explained later.

In step S303, the touch position detector 214c converts the touch position of the touch panel 212 touched by the user into a coordinate of the image sensor 203. More specifically, the touch position detector 214c uses the expression (6) and the expression (8) to convert the touch position of the touch panel 212 touched by the user into the position (coordinate) of the image sensor 203.

Subsequently, on the basis of the converted position converted by the touch position detector 214c, the display controller 214g causes the display unit 211 to display a frame R1 of the target area including the touch position (step S304). This enables the user to intuitively understand the touch area touched by the user.

Steps S305 and S306 correspond to steps S209 and S210 of FIG. 8, respectively. Thereafter, the imaging apparatus 1 returns back to the main routine of FIG. 4.

In step S307, the control unit 214 determines whether the user slides the touch position toward the lower right of the display unit 211. More specifically, on the basis of the position signal which is output from the touch panel 212, the control unit 214 determines whether the value of X of the coordinate on the image sensor 203 converted by the touch position detector 214c is increased and the value of Y of the coordinate on the image sensor 203 converted by the touch position detector 214c is decreased, thereby determining whether the user slides the touch position toward the lower right of the display unit 211. When the control unit 214 determines that the user slides the touch position toward the lower right of the display unit 211 (step S307: Yes), the imaging apparatus 1 proceeds to step S308. On the other hand, when the control unit 214 determines that the user does not slide the touch position toward the lower right of the display unit 211 (step S307: No), the imaging apparatus 1 proceeds to step S305.

In step S308, the control unit 214 determines whether the current continuously-touched position is within one-third in the vertical direction and the horizontal direction of the lower right screen of the display unit 211. When the control unit 214 determines that the current continuously-touched position is within one-third in the vertical direction and the horizontal direction of the lower right screen of the display unit 211 (step S308: Yes), the imaging apparatus 1 proceeds to step S309. On the other hand, when the control unit 214 determines that the current continuously-touched position is not within one-third in the vertical direction and the horizontal direction of the lower right screen of the display unit 211 (step S308: No), the imaging apparatus 1 proceeds to step S305.

In step S309, the trimming unit 214d crops the target area R1 including the touch position from the live-view image and generates the enlarged image.

Subsequently, the display controller 214g displays the enlarged image generated by the trimming unit 214d in a display area of two-third in the vertical direction and the horizontal direction of the upper left screen of the display unit 211 (step S310). Accordingly, the user operates the ring 309a and manually changes the focus of the lens unit 3 while seeing the enlarged image obtained by enlarging the desired subject O1 displayed by the display unit 211, and thus the user can adjust the focus state concerning the subject O1.

Steps S311 and S312 correspond to steps S216 and S217 of FIG. 8, respectively.

According to the first embodiment of the present invention explained above, the trimming unit 214d generates the enlarged image by cropping the area including the touch position from the image corresponding to the image data generated by the image sensor 203 on the basis of the position signal which is output from the touch panel 212, and the display controller 214g causes the eyepiece display unit 42 to display the enlarged image. As a result, the user can easily change the focus operation concerning the subject while confirming the focus state of the subject on the eyepiece display unit 42.

In addition, according to the first embodiment of the present invention, the trimming unit 214d generates enlarged image data by cropping the area including the touch position from the image data generated by the image sensor 203 on the basis of the position signal which is output from the touch panel 212, and the display controller 214g overlays the trimming image corresponding to the trimming image data generated by the trimming unit 214d onto the live-view image and causes the display unit 211 to display the live-view image with the trimming image overlaid thereon, and in addition, controls the display mode of the trimming image in accordance with change of the position signal which is output from the touch panel 212. As a result, the user can easily change the focus operation concerning the subject by confirming the enlarged image.

In addition, according to the first embodiment of the present invention, the parameter change unit 214e outputs the driving signal for driving the zoom lens 301a or focus lens 301b to the lens controller 312 in accordance with operation performed with the ring 309a of the lens operating unit 309, thus changing the display magnification rate of the subject included in the enlarged image or the display area size of the enlarged image. As a result, the user can easily adjust the magnification rate or the focus state of the desired subject while performing focus operation or zoom operation.

According to the first embodiment of the present invention, the parameter change unit 214e changes the magnification rate or the focus state of the lens unit 3 in accordance with operation performed with the ring 309a, thus changing the display mode of the enlarged image. However, for example, the display mode of the enlarged image may be changed by changing a shutter speed, a shooting sensitivity (ISO sensitivity), or an exposure time.

According to the first embodiment of the present invention, the display controller 214g displays the enlarged image, generated by the trimming unit 214d, in the display area of two-third in the vertical direction and the horizontal direction of the upper left screen of the display unit 211. However, for example, the enlarged image may be displayed in a display area of two-third in the vertical direction and the horizontal direction of a lower left screen of the display unit 211. Further, the display controller 214g may change, as necessary, the display position at which the enlarged image is displayed, in accordance with the position signal which is output from the touch panel 212.

First Modification of the First Embodiment

In the first embodiment explained above, the contents of the touch panel operation determination/parameter change processing 2 executed by the imaging apparatus 1 can be changed. Therefore, in the explanation below, first, overview of the touch panel operation determination/parameter change processing 2 executed by the imaging apparatus 1 according to the first modification of the first embodiment will be explained. Thereafter, the touch panel operation determination/parameter change processing 2 according to the first modification of the first embodiment will be explained in detail.

Figure 14:
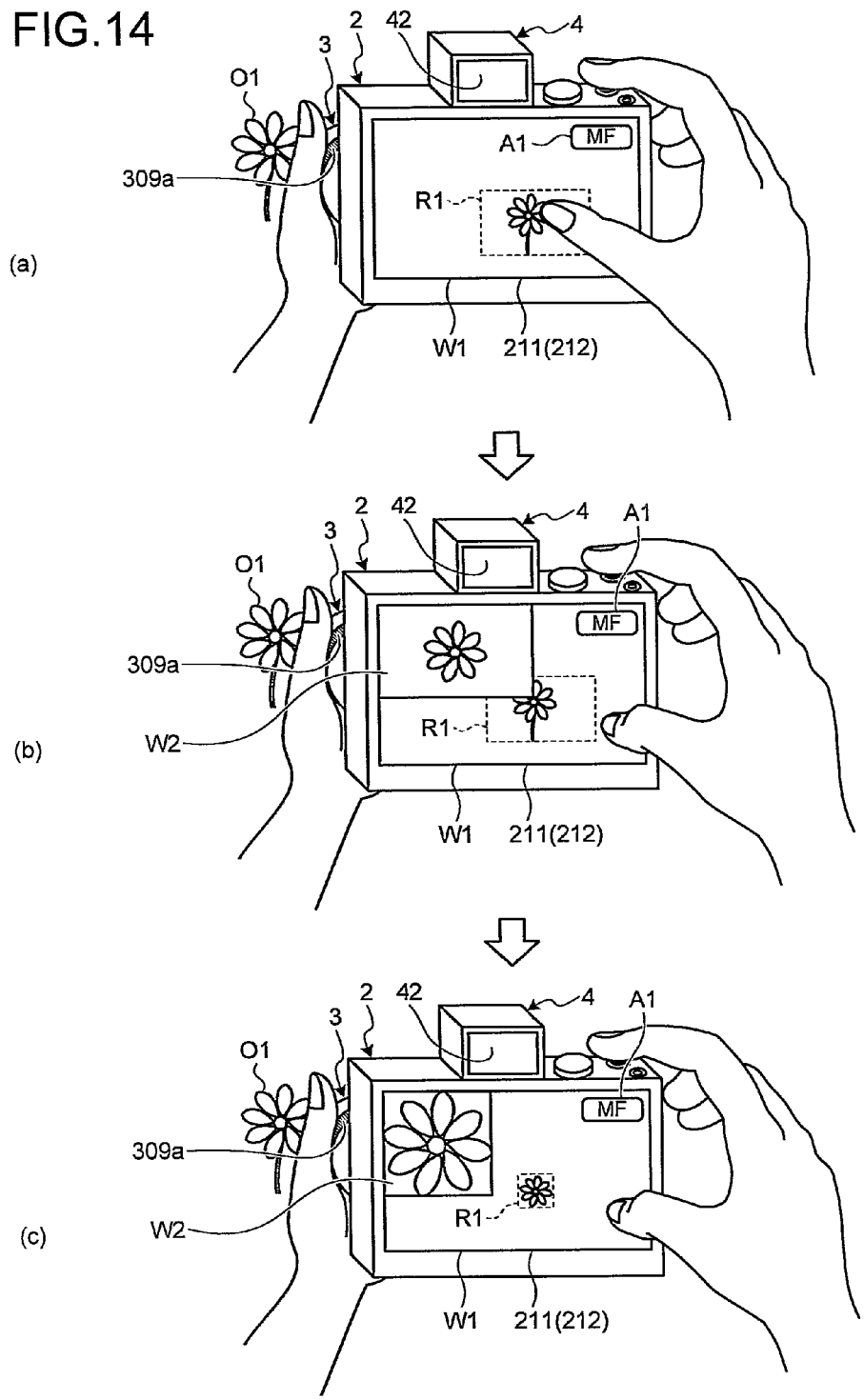
FIG. 14 is a figure schematically illustrating touch panel operation determination/parameter change processing 2 executed by an imaging apparatus according to a first modification of the first embodiment of the present invention.

FIG. 14 is a figure schematically illustrating touch panel operation determination/parameter change processing 2 executed by the imaging apparatus 1 according to the first modification of the first embodiment. In the explanation about FIG. 14, the lens unit 3 is held with the left hand of the user, which is not illustrated in the explanation for the sake of simplicity.

As illustrated in FIG. 14, when the user touches the subject O1 in the live-view image W1 displayed on the display unit 211 using the touch panel 212 with the thumb of the right hand (FIG. 14(a)), the trimming unit 214d crops the target area R1 including the touch position and generates the enlarged image W2, and then, the display controller 214g causes the display controller 214g to display the enlarged image W2 on the upper left screen of the display unit 211 (FIG. 14(b)). Subsequently, the parameter change unit 214e changes the display area size of the enlarged image W2 and the display magnification rate of the subject (O1) included in the enlarged image W2 in accordance with slide operation (track) of the user. Thereafter, the display controller 214g causes the display unit 211 to display the enlarged image W2 generated by the trimming unit 214d, on the basis of the display area size of the enlarged image W2 and the display magnification rate of the enlarged image W2 changed by the parameter change unit 214e (FIG. 14(c)). In this case, as illustrated in FIG. 14, the parameter change unit 214e gradually reduces the target area R1 (trimming area) of the trimming unit 214d, in accordance with the slide operation performed by the user, so that the subject O1 included in the enlarged image W2 can be virtually enlarged. Further, in FIG. 14, the parameter change unit 214e may gradually increase the target area R1 of the trimming unit 214d in accordance with the slide operation performed by the user, so that the subject O1 included in the enlarged image W2 is virtually reduced.

As described above, in the touch panel operation determination/parameter change processing 2 executed by the imaging apparatus 1 according to the first modification of the first embodiment, the user operates the ring 309a while confirming the focus of the subject O1 which is difficult to be done by means of visual observation while maintaining the state of holding the imaging apparatus 1, and this allows the user to easily change the focus position of the lens unit 3 concerning the subject O1. Further, the display area size of the enlarged image W2 and the display magnification rate of the subject O1 included in the enlarged image W2 can be changed in accordance with the slide operation performed by the user, and this allows the user to perform more accurate and simple operation to adjust the focus of the lens unit 3 concerning the subject O1. It is to be understood that, in the first modification of the first embodiment, the image (trimming image) generated by cropping process may be enlarged or reduced while the trimming area itself of the trimming unit 214d is maintained as it is.

Figure 15:
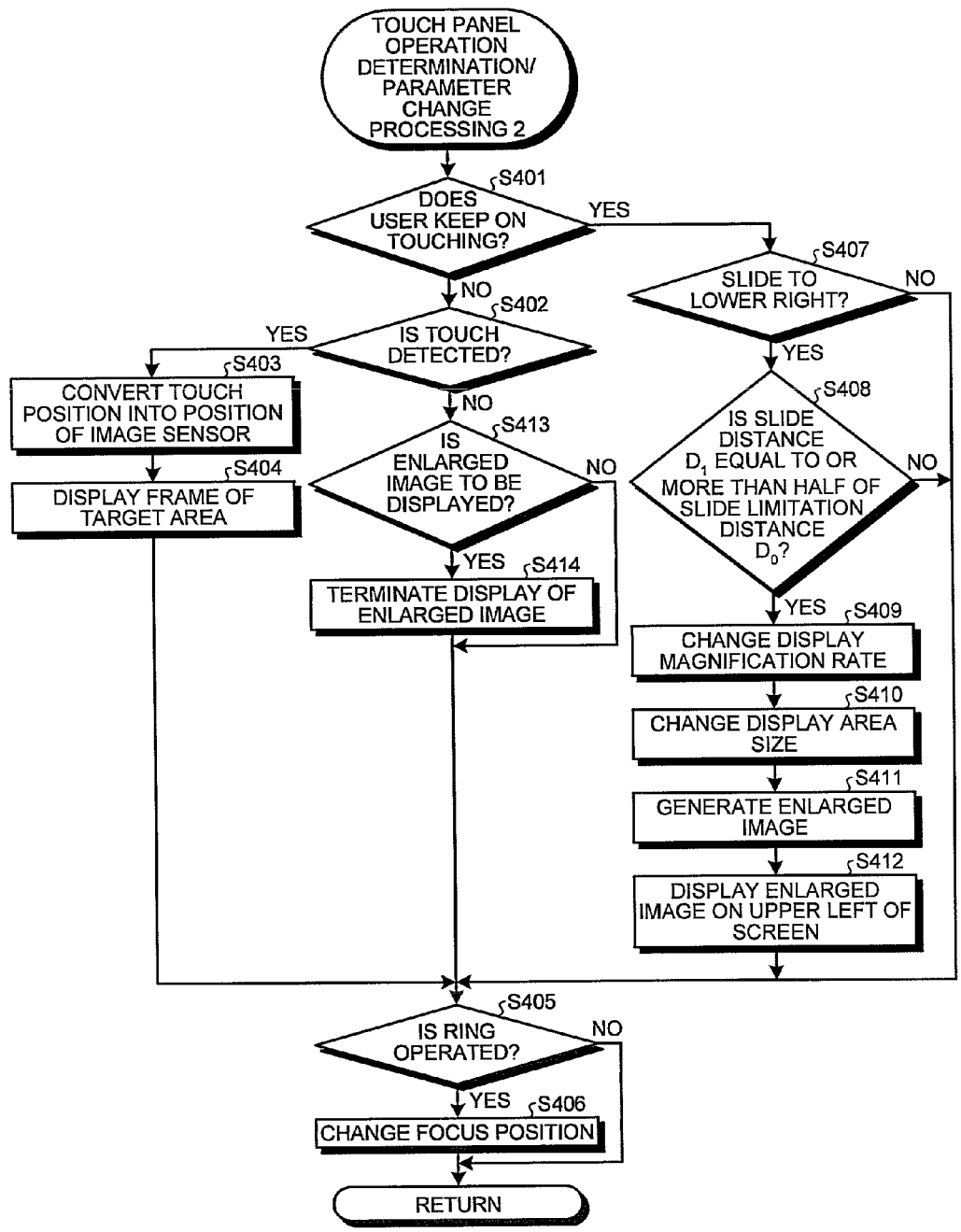
FIG. 15 is a flowchart illustrating overview of the touch panel operation determination/parameter change processing 2 executed by the imaging apparatus according to the first modification of the first embodiment of the present invention.

FIG. 15 is a flowchart illustrating overview of the touch panel operation determination/parameter change processing 2 in step S110 of FIG. 4 executed by the imaging apparatus according to the first modification of the first embodiment.

As illustrated in FIG. 15, steps S401 to S406 correspond to steps S301 to S306 of FIG. 13, respectively.

In step S407, the control unit 214 determines whether the user slides the touch position toward the lower right of the display unit 211. When the control unit 214 determines that the user slides the touch position toward the lower right of the display unit 211, (step S407: Yes), the imaging apparatus 1 proceeds to step S408. On the other hand, when the control unit 214 determines that the user does not slide the touch position toward the lower right of the display unit 211 (step S407: No), the imaging apparatus 1 proceeds to step S405.

In step S408, the control unit 214 determines whether a slide movement distance $D_1$ between a touch position (A point) initially touched by the user and a current continuously-touched position is equal to or more than half of a slide limitation distance $D_0$ between the initially-touched touch position and the lower right portion of the display unit 211. When the control unit 214 determines that the slide movement distance $D_1$ is equal to or more than half of the slide limitation distance $D_0$ (step S408: Yes), the imaging apparatus 1 proceeds to step S409. On the other hand, when the control unit 214 determines that the slide movement distance $D_1$ is not equal to or more than half of the slide limitation distance $D_0$ (step S408: No), the imaging apparatus 1 proceeds to step S405.

Figure 16:
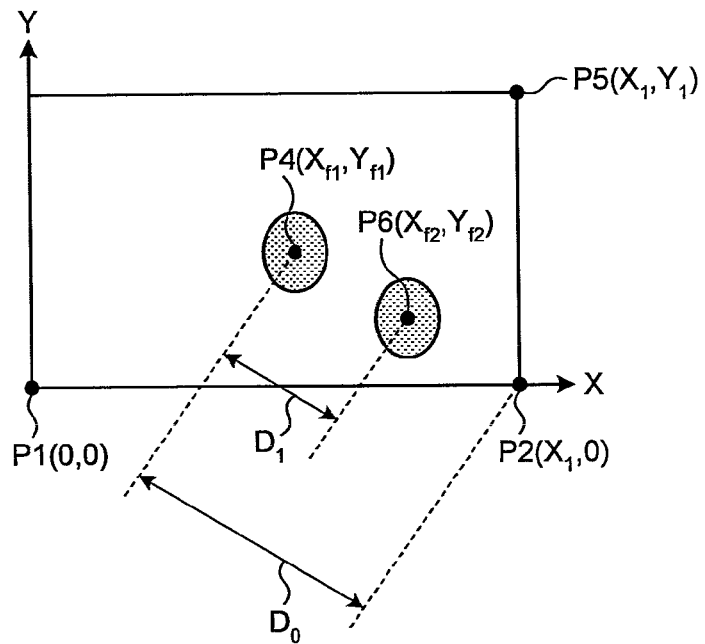
FIG. 16 is a figure schematically illustrating a conversion method used by the touch position detector to convert a touch position of the touch panel into a shooting area of the image sensor.

FIG. 16 is a figure schematically illustrating a conversion method used by the touch position detector 214c to convert a touch position of the touch panel 212 into an image-capturing area of the image sensor 203. In FIG. 16, a coordinate system is considered in which a lower left point of the touch panel 212 is denoted as an origin point P1, a horizontal direction of the touch panel 212 is denoted as an X-axis, and a vertical direction of the touch panel 212 is denoted as a Y-axis.

As illustrated in FIG. 16, the coordinate of the point P2 at the lower right of the touch panel 212 is denoted as $(X_1, 0)$, the coordinate of a point P5 at the upper right of the touch panel 212 is denoted as $(X_1, Y_1)$, the coordinate of the touch position P4 that is initially touched is denoted as $(X_{f1}, Y_{f1})$, and the coordinate of the touch position P6 after the slide movement is denoted as $(X_{f2}, Y_{f2})$. In this case, the touch position detector 214c uses the following expression to calculate a slide limitation distance $D_0$ between the touch position P4 and the point P2 and a slide distance movement $D_1$ between the touch position P4 and the continuously-touched position P6. The following expression is obtained.

$$D_0 = \{(X_1 - X_{f1})^2 + (Y_{f1})^2\}^{1/2} \quad (9)$$

Likewise, the slide distance $D_1$ between the touch position P4 and the continuously-touched position P6 is as follows.

$$D_1 = \{(X_{f2} - X_{f1})^2 + (Y_{f1} - Y_{f2})^2\}^{1/2} \quad (10)$$

As described above, the touch position detector 214c uses the expression (9) and expression (10) to calculate the slide limitation distance $D_0$ and the slide movement distance $D_1$.

Subsequently, the parameter change unit 214e changes the display magnification rate of the enlarged image on the basis of the ratio between the slide limitation distance $D_0$ and the slide distance $D_1$ calculated by the touch position detector 214c (step S409).

Figure 17:
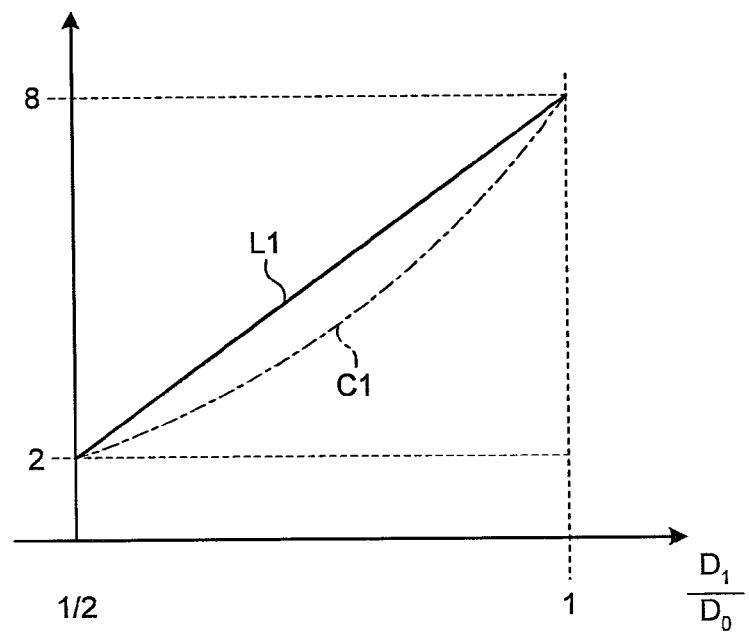
FIG. 17 is a figure illustrating relationship between a ratio of a slide distance and a slide limitation distance and a display magnification rate of an enlarged image.

FIG. 17 is a figure illustrating relationship between the ratio of the slide distance $D_1$ and the slide limitation distance $D_0$ and the display magnification rate of the enlarged image. In FIG. 17, the horizontal-axis represents the ratio between the slide distance $D_1$ and the slide limitation distance $D_0$, and the vertical-axis represents the display magnification rate of the enlarged image. It should be noted that the storage unit 213 stores the ratio between the slide distance $D_1$ and the slide limitation distance $D_0$ and the display magnification rate of the enlarged image.

As indicated by a straight line L1 in FIG. 17, the parameter change unit 214e changes the display magnification rate of the enlarged image, on the basis of the ratio between the slide distance $D_1$ and the slide limitation distance $D_0$. As described above, the parameter change unit 214e linearly changes the display magnification rate of the enlarged image on the basis of the slide distance $D_1$ by the user. Accordingly, the first modification of the first embodiment can provide analogue-like operational feeling to the user. As indicated by a curved line C1 of FIG. 17, as the ratio between the slide distance $D_1$ and the slide limitation distance $D_0$ becomes closer to 1, the parameter change unit 214e greatly changes the display magnification rate of the enlarged image.

Accordingly, this can prevent the image quality from being rough when the enlarged image is enlarged.

After step S409, the parameter change unit 214e changes the display area size of the enlarged image, on the basis of the ratio between the slide distance $D_1$ and the slide limitation distance $D_0$ (step S410).

Figure 18:
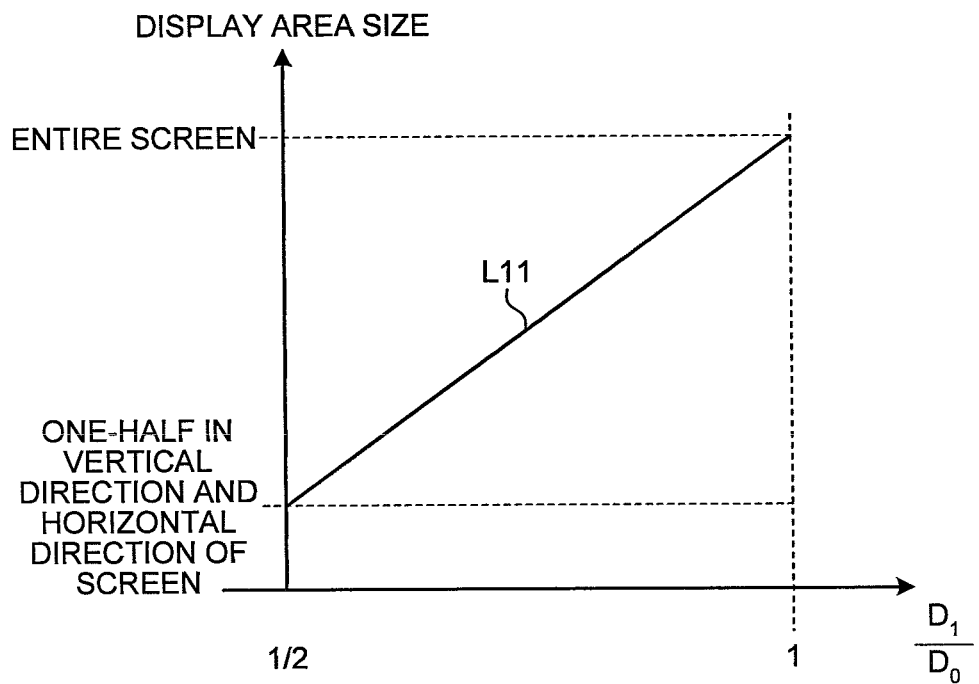
FIG. 18 is a figure illustrating relationship between a ratio of a slide distance and a slide limitation distance and a display area size of an enlarged image.

FIG. 18 is a figure illustrating relationship between the ratio between the slide distance $D_1$ and the slide limitation distance $D_0$ and the display area size of the enlarged image. In FIG. 18, the horizontal-axis represents the ratio between the slide distance $D_1$ and the slide limitation distance $D_0$, and the vertical-axis represents the display area size of the enlarged image. It should be noted that storage unit 213 stores the ratio between the slide distance $D_1$ and the slide limitation distance $D_0$ and the display area size of the enlarged image.

As indicated by a straight line L11 in FIG. 18, the parameter change unit 214e determines the display area size of the enlarged image displayed on the display unit 211, on the basis of the ratio between the slide distance $D_1$ and the slide limitation distance $D_0$. More specifically, when the ratio between the slide distance $D_1$ and the slide limitation distance $D_0$ becomes 1, the parameter change unit 214e changes the display area size of the enlarged image so that the display area size of the enlarged image displayed on the display unit 211 are on the entire screen of the display unit 211. Accordingly, the parameter change unit 214e gradually changes the display area size of the enlarged image on the basis of the slide distance $D_1$ by the user, and therefore, analogue-like operational feeling can be provided to the user.

Subsequently, the trimming unit 214d generates the enlarged image by cropping the target area including the touch position, on the basis of the display area size and the display magnification rate set by the parameter change unit 214e (step S411).

Thereafter, the display controller 214g causes the enlarged image generated by the trimming unit 214d to be displayed at the upper left of the screen of the display unit 211 (step S412). Accordingly, the user can confirm the focus state of the desired subject with analogue-like operational feeling, and can adjust the display area size and the display magnification rate of the enlarged image with simple operation. After step S412, the imaging apparatus 1 proceeds to step S405.

Steps S413 and S414 correspond to steps S311 and S312 of FIG. 13, respectively.

According to the first modification of the first embodiment of the present invention explained above, the user can move the display area of the enlarged image for confirming the focus of the desired subject, and can change the size of the display area. As a result, the user can intuitively understand the focus of the desired subject while keeping the state of holding the imaging apparatus 1, and can easily and quickly adjust the focus of the subject by operating the ring 309a.

Figure 19:
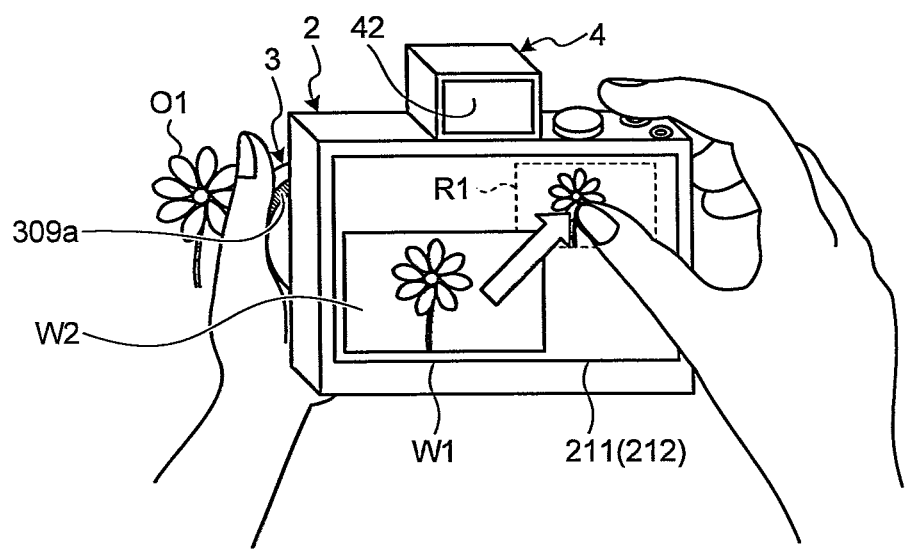
FIG. 19 is a figure schematically illustrating another overview of touch panel operation determination/parameter change processing 2 executed by the imaging apparatus according to the first modification of the first embodiment of the present invention.

It should be noted that, in the touch panel operation determination/parameter change processing 2 according to the first modification of the first embodiment, the user moves the slide operation from the upper left to the lower right of the display unit 211. However, for example, as illustrated in FIG. 19, this can be applied even when the user moves the slide operation from the lower left to the upper right of the display unit 211.

In addition, in the first modification of the first embodiment, the parameter change unit 214e changes the display area size of the enlarged image and the display magnification rate of the subject included in the enlarged image, in accordance with the slide operation performed by the user. However, for example, the trimming area provided by the trimming unit 214d may be enlarged or reduced in accordance with the slide operation performed by the user. Accordingly, the subject included in the enlarged image can be virtually enlarged ore reduced.

Second Modification of the First Embodiment

In the first embodiment explained above, the contents of the touch panel operation determination/parameter change processing 2 executed by the imaging apparatus 1 can be further changed.

Figure 20:
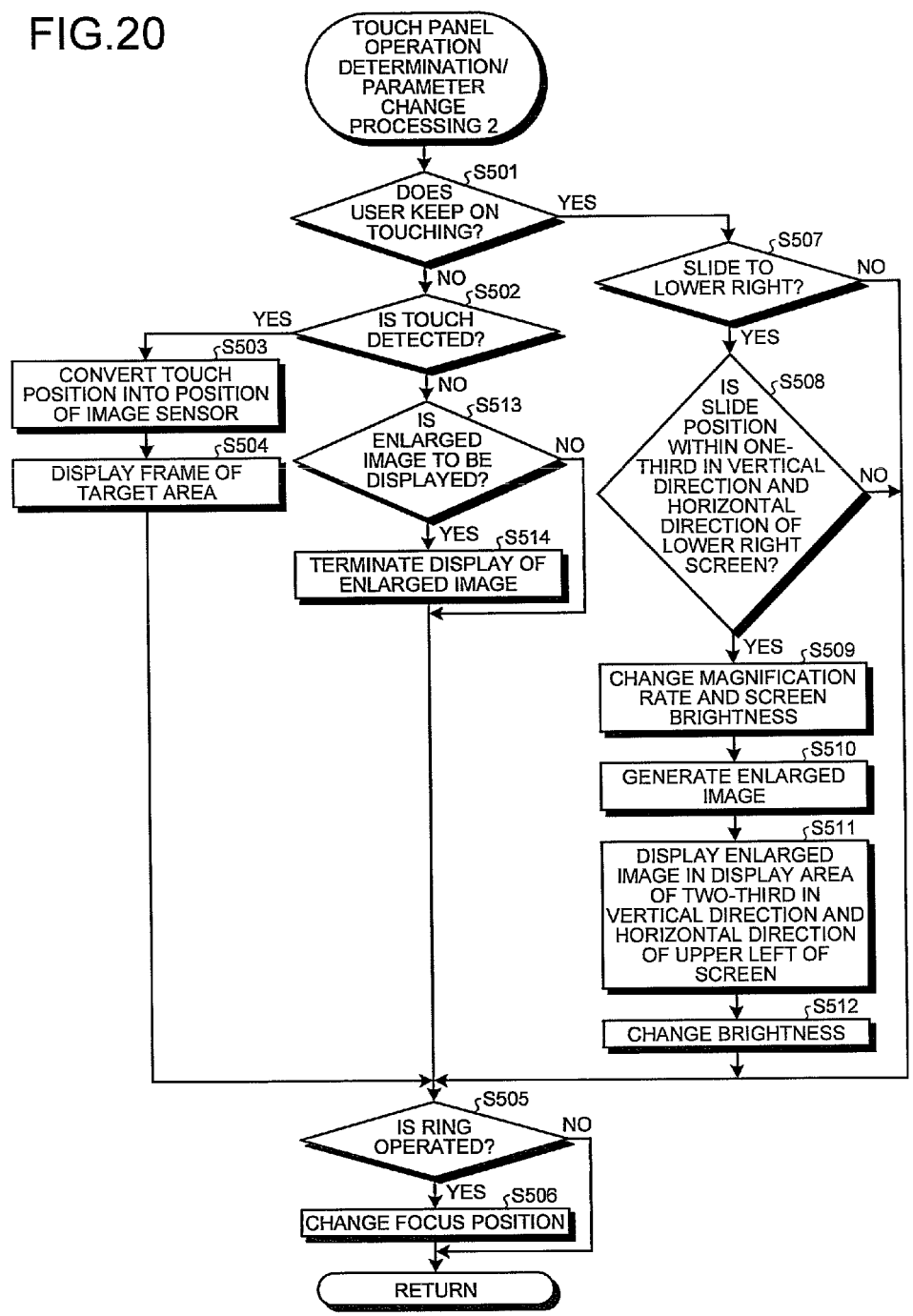
FIG. 20 is a flowchart illustrating overview of touch panel operation determination/parameter change processing 2 executed by the imaging apparatus according to a second modification of the first embodiment of the present invention.

FIG. 20 is a flowchart illustrating overview of touch panel operation determination/parameter change processing 2 in step S110 of FIG. 4 executed by an imaging apparatus 1 according to the second modification of this first embodiment.

As illustrated in FIG. 20, steps S501 to S507 correspond to steps S301 to S307 of FIG. 13, respectively.

In step S508, the control unit 214 determines whether the current continuously-touched position from the touch position initially touched by the user is within one-third in the vertical direction and the horizontal direction of the lower right screen of the display screen of the display unit 211. When the control unit 214 determines that the current continuously-touched position from the touch position initially touched by the user is within one-third in the vertical direction and the horizontal direction of the lower right screen of the display screen of the display unit 211 (step S508: Yes), the imaging apparatus 1 proceeds to step S509. On the other hand, when the control unit 214 determines that the current continuously-touched position from the touch position initially touched by the user is not within one-third in the vertical direction and the horizontal direction of the lower right screen of the display screen of the display unit 211 (step S508: No), the imaging apparatus 1 proceeds to step S505. In this case, the reason why one-third in the vertical direction and the horizontal direction of the screen is used is that, when the touched/selected portion is shifted to the portion of one-third in the vertical direction and the horizontal direction of the screen, the remaining portion of two-third in the vertical direction and the horizontal direction of the screen serves as the display portion of the image, and when it is enlarged here, a sufficiently large enlargement area can be obtained. For example, when the user selects an image of one-third in the vertical direction and the horizontal direction of the screen with the touched portion being the center, first, this allows enlargement to double the size. If the user wants further enlargement, the user moves a finger using an area of one-third in the vertical direction and the horizontal direction of this lower right screen to make further enlargement, and this specification enables operation with a sufficiently high operational resolution. If this area is too small, the apparatus becomes too sensitive to shaking of a finger, which results in a malfunction where slight movement changes the magnification rate which makes flickering.

In step S509, the parameter change unit 214e changes the screen brightness of the display unit 211 and the magnification rate of the enlarged image, on the basis of the ratio between slide movement distance $D_1$ and the slide limitation distance $D_0$.

Figure 21:
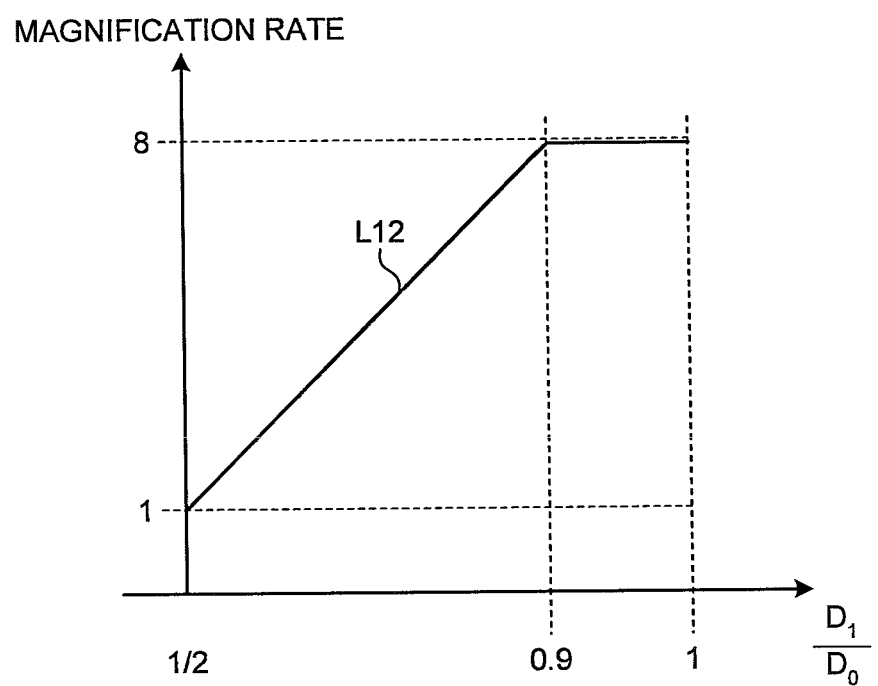
FIG. 21 is a figure illustrating relationship between a ratio of a slide distance and a slide limitation distance and a display magnification rate of an enlarged image.

FIG. 21 is a figure illustrating relationship between the ratio between the slide distance $D_1$ and the slide limitation distance $D_0$ and the display magnification rate of the enlarged image. In FIG. 21, the horizontal-axis represents the ratio between the slide distance $D_1$ and the slide limitation distance $D_0$, and the vertical-axis represents the display magnification rate of the enlarged image. It should be noted that the storage unit 213 stores the ratio between the slide distance $D_1$ and the slide limitation distance $D_0$ and the display magnification rate of the enlarged image.

As indicated by a straight line L12 in FIG. 21, the parameter change unit 214e changes the display magnification rate of the subject included in the enlarged image, on the basis of the ratio between the slide distance $D_1$ and the slide limitation distance $D_0$. Further as illustrated in FIG. 21, as soon as the ratio between the slide distance $D_1$ and the slide limitation distance $D_0$ attains 0.9, the parameter change unit 214e changes the display magnification rate of the enlarged image to the maximum magnification rate (×8). In this case, as soon as the ratio between the slide distance $D_1$ and the slide limitation distance $D_0$ is more than 0.9, the parameter change unit 214e changes the parameters of the brightness of the enlarged image and the live-view image displayed by the display unit 211. More specifically, the parameter change unit 214e changes the light intensity information of the enlarged image and the live-view image such as brightness information, contrast, and color information. This improves the visibility of the live-view image and the enlarged image. As a result, this can reliably prevent the user from being unable to see the live-view image and the enlarged image displayed by the display unit 211 due to the effect of external light. Further, as soon as the ratio between the slide distance $D_1$ and the slide limitation distance $D_0$ becomes more than 0.9, the parameter change unit 214e may change the brightness of the live-view image and the enlarged image displayed by the display unit 211 to the maximum value. When the ratio between the slide distance $D_1$ and the slide limitation distance $D_0$ is more than 0.9, the parameter change unit 214e may change the brightness of the display unit 211 in accordance with the remaining amount of a battery (not illustrated) as necessary.

After step S509, the trimming unit 214d generates the enlarged image by cropping the target area including the touch position, on the basis of the display magnification rate set by the parameter change unit 214e (step S510).

Subsequently, the display controller 214g causes the display unit 211 to display the enlarged image generated by the trimming unit 214d in the display area in the two-third in the vertical direction and the horizontal direction of the upper left of the screen of the display screen of the display unit 211 (step S511), the brightness of the display screen of the display unit 211 is changed to the parameter of the brightness changed by the parameter change unit 214e (step S512). Thereafter, the imaging apparatus 1 proceeds to step S505.

Steps S513 and S514 correspond to steps S311 and S312 of FIG. 13, respectively.

According to the second modification of this first embodiment explained above, on the basis of change of the position signal which is output from the touch panel 212, the parameter change unit 214e changes the magnification rate of the subject included in the enlarged image, changes the parameters of the brightness of the live-view image and the enlarged image displayed by the display unit 211. As a result, this can reliably prevent the user from being unable to see the live-view image and the enlarged image displayed by the display unit 211 due to the effect of external light.

Third Modification of the First Embodiment

In the first embodiment explained above, the contents of the touch panel operation determination/parameter change processing 2 executed by the imaging apparatus 1 can be further changed.

Figure 22:
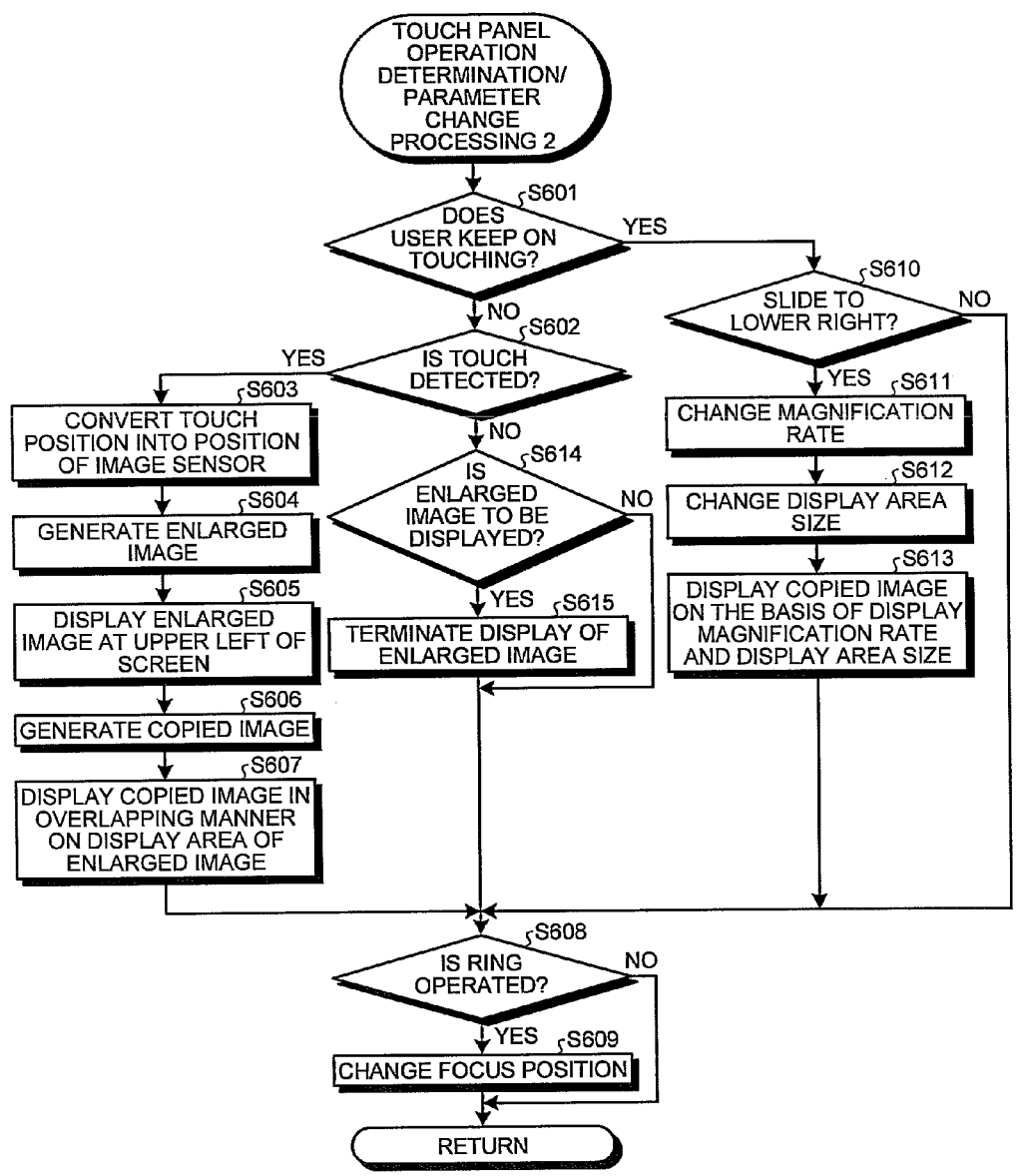
FIG. 22 is a flowchart illustrating overview of touch panel operation determination/parameter change processing 2 executed by an imaging apparatus according to a third modification of the first embodiment of the present invention.

FIG. 22 is a flowchart illustrating overview of the touch panel operation determination/parameter change processing 2 in step S110 of FIG. 4 executed by the imaging apparatus 1 according to the third modification of this first embodiment.

As illustrated in FIG. 22, steps S601 to S603 correspond to steps S301 to S303 of FIG. 13, respectively.

In step S604, the trimming unit 214d generates the enlarged image by cropping the target area including the touch area touched by the user from the live-view image, on the basis of the position signal which is input from the touch panel 212.

Subsequently, the display controller 214g causes the enlarged image generated by the trimming unit 214d to be displayed at the upper left of the display area of the display unit 211 (step S605). More specifically, as illustrated in FIG. 23, the display controller 214g causes the enlarged image W2 to be displayed at the upper left of the display area of the display unit 211 (see FIG. 23(a)). Accordingly, the user can confirm the focus state of the lens unit 3 concerning the desired subject O1 by confirming the enlarged image.

Thereafter, the trimming unit 214d generates a copied image of the same size as the enlarged image generated by cropping the target area including the touch area touched by the user from the live-view image, on the basis of the position signal which is input from the touch panel 212 (step S606).

Subsequently, the display controller 214g overlays the copied image generated by the trimming unit 214d onto the display area of the enlarged image, and causes the display unit 211 to display the enlarged image with the copied image overlaid thereon (step S607).

Step S608 to S610, step S614, and step S615 correspond to steps S305 to S307, step S311, and step S312 of FIG. 13, respectively.

In step S611, the parameter change unit 214e changes the enlargement magnification rate of the copied image on the basis of the slide distance.

Subsequently, the parameter change unit 214e changes the display size and the magnification rate of the copied image in the display area of the display unit 211 on the basis of the slide distance (step S612).

Thereafter, the display controller 214g causes the display unit 211 to display the copied image which has been changed on the basis of the display size and the magnification rate of the copied image set by the parameter change unit 214e (step S613). More specifically, as illustrated in FIG. 23, the display controller 214g causes the display unit 211 to display a copied image W3 of which display size and magnification rate are more than those of the enlarged image W2 (see FIG. 23(b)). Accordingly, the user can capture an image while comparing, with regard to the desired subject O1, the focus state of the subject in the initial state and the focus state of the subject in more details.

According to the third modification of this first embodiment of the present invention explained above, while the enlarged image for confirming the focus of the subject desired by the user is displayed in a fixed manner, the display area of the copied image obtained by copying the enlarged image can be moved, and in addition the size of the display area can be changed. As a result, the user can intuitively understand the focus of the desired subject while keeping the state of holding the imaging apparatus 1, and can easily and quickly adjust the focus of the subject by operating the ring 309a.

Second Embodiment

Subsequently, the second embodiment of the present invention will be explained. An imaging apparatus according to the second embodiment of the present invention is different in the configuration of a control unit, and further includes a motion picture processing unit for causing a storage unit to store enlarged image data generated by a trimming image generating unit and image data of an ordinary size displayed by a display unit (hereinafter referred to as "MR processing unit"). Further, each of the touch panel determination processing/parameter change processing 1 and the touch panel determination processing/parameter change processing 2 explained above is different. Therefore, in the second embodiment of the present invention, the configuration of the control unit will be explained, and thereafter, the touch panel determination processing/parameter change processing 1 and the touch panel determination processing/parameter change processing 2 performed by the imaging apparatus according to the second embodiment of the present invention will be explained. In the explanation below, the same elements are denoted with the same reference numerals.

Figure 24:
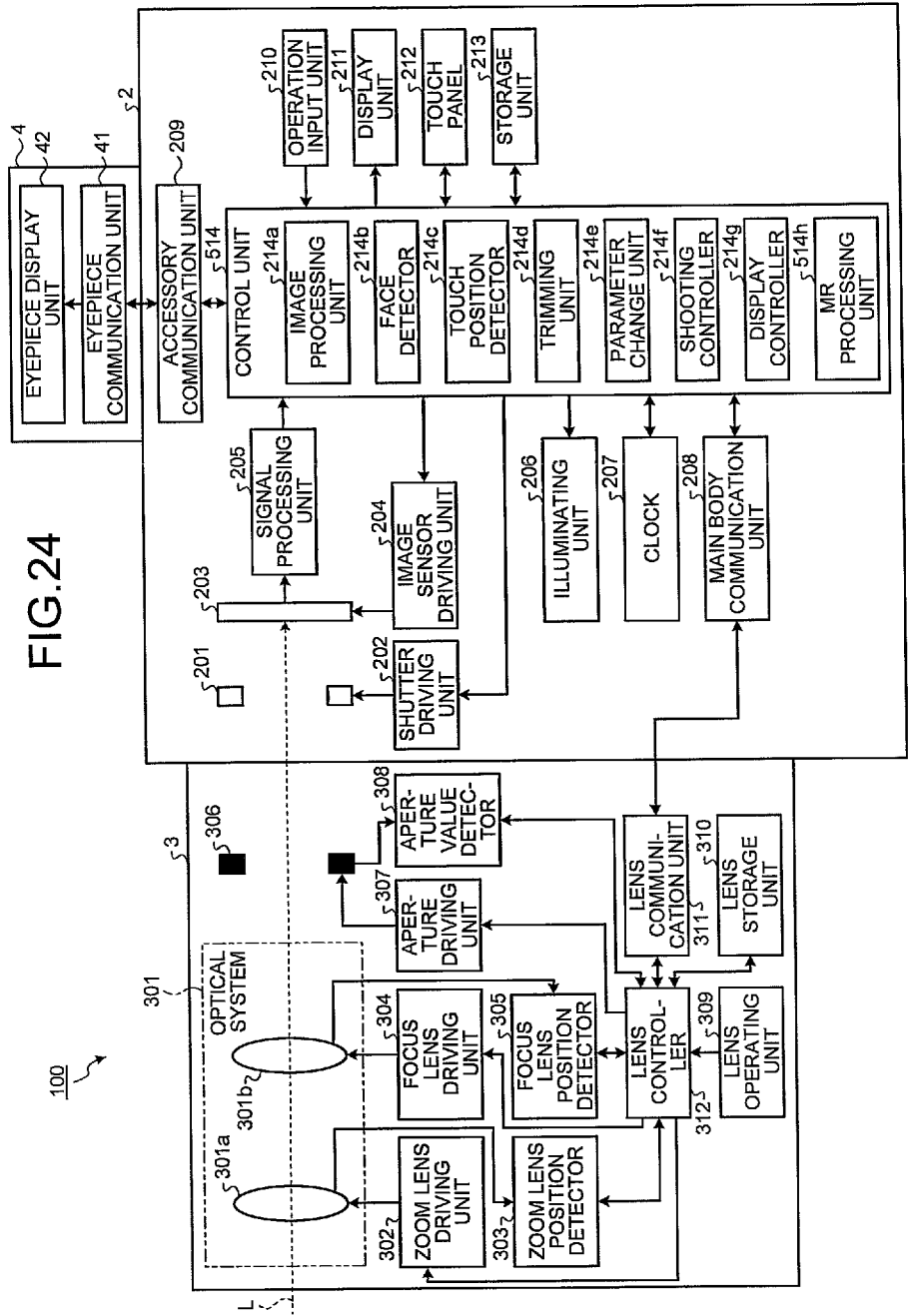
FIG. 24 is a block diagram illustrating a configuration of an imaging apparatus according to a second embodiment of the present invention.

FIG. 24 is a block diagram illustrating a configuration of an imaging apparatus 100 according to the second embodiment of the present invention. As illustrated in FIG. 24, a control unit 514 includes an image processing unit 214a, a face detector 214b, a touch position detector 214c, a trimming unit 214d, a parameter change unit 214e, a shooting controller 214f, a display controller 214g, an MR processing unit 514h.

The MR processing unit 514h causes the storage unit 213 to store, in the order of generation, image data on which the signal processing unit 205 and the image processing unit 214a successively perform predetermined image processing on image data generated continuously by the image sensor 203 and enlarged image data which the trimming unit 214d successively crops from a target area in the image corresponding to the image data. It should be noted that the MR processing unit 514h is made using, for example, two image processing engines. The MR processing unit 514h may perform each of two different kinds of image processing such as ordinary image processing and image processing including trimming processing on one piece of image data (one frame) which is output from the image sensor 203, and may cause the storage unit 213 to store two pieces of image data on which different image processing has been performed.

Figure 25:
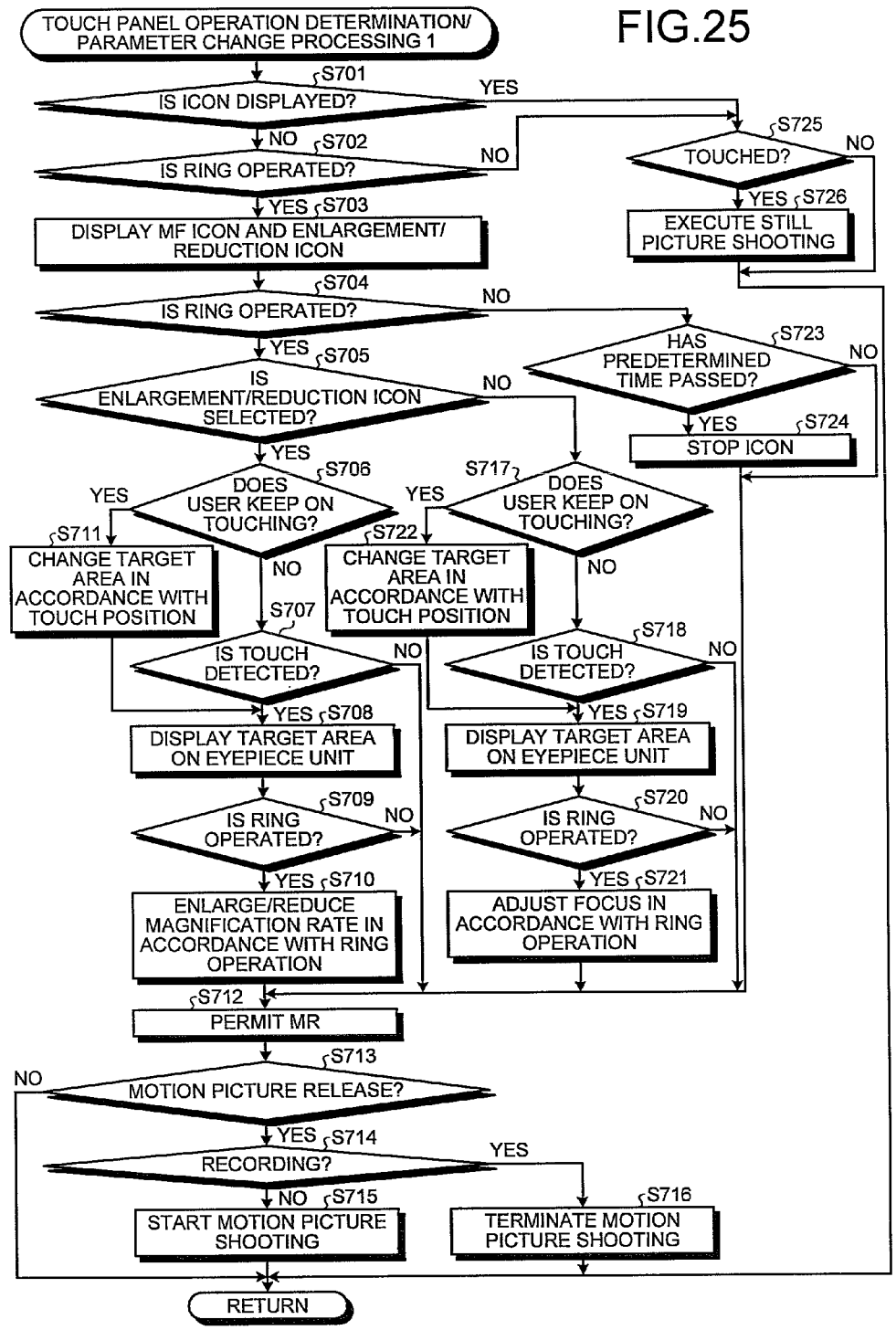
FIG. 25 is a flowchart illustrating overview of touch panel operation determination/parameter change processing 1 executed by an imaging apparatus according to the second embodiment of the present invention.

Subsequently, the touch panel operation determination/parameter change processing 1 in step S104 of FIG. 4 executed by the imaging apparatus 100 according to this second embodiment will be explained. FIG. 25 is a flowchart illustrating overview touch panel operation determination/parameter change processing 1 executed by the imaging apparatus 100 according to this second embodiment.

As illustrated in FIG. 25, the control unit 514 determines whether an icon representing a shooting operation is displayed in a live-view image displayed by an eyepiece display unit 42 (step S701). When the control unit 514 determines that the icon representing the shooting operation is displayed in the live-view image displayed by the eyepiece display unit 42 (step S701: Yes), the imaging apparatus 100 proceeds to step S725 explained later. On the other hand, when the control unit 514 determines that the icon representing the shooting operation is not displayed in the live-view image displayed by the eyepiece display unit 42 (step S701: No), the imaging apparatus 100 proceeds to step S702 explained later.

Figure 26:
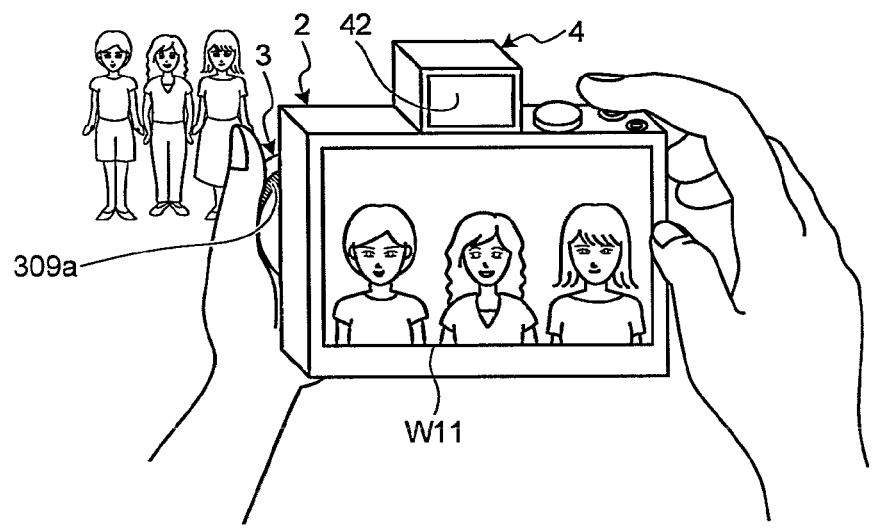
FIG. 26 is a figure schematically illustrating a situation where a user touches an image displayed on the display unit.

In step S702, the control unit 514 determines whether a ring 309a is operated or not. More specifically, as illustrated in FIG. 26, the control unit 514 determines whether a command signal which is input from the ring 309a is output or not while the user performs shooting operation while seeing a live-view image W11 displayed by the display unit 211 or a live-view image displayed by the eyepiece display unit 42, thereby determining whether the ring 309a has been operated or not. When the control unit 514 determines that the ring 309a has been operated (step S702: Yes), the imaging apparatus 100 proceeds to step S703 explained later. On the other hand, when the control unit 514 determines that the ring 309a is not operated (step S702: No), the imaging apparatus 100 proceeds to step S725 explained later.

Figure 27:
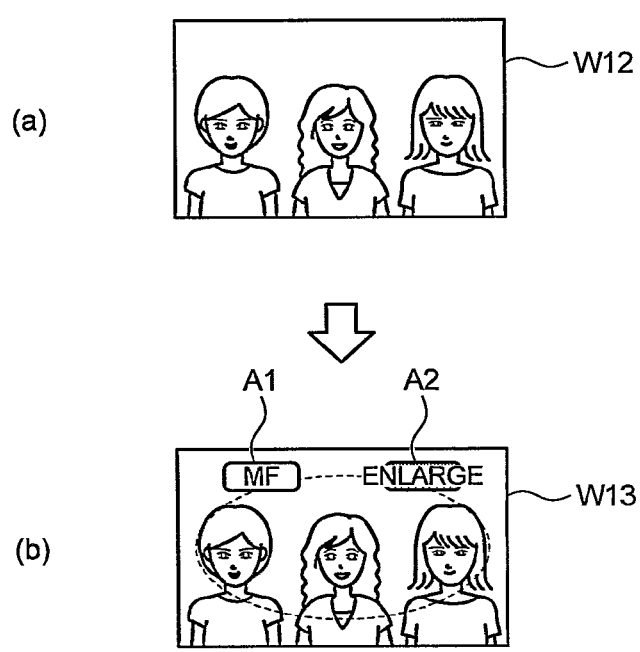
FIG. 27 is a figure illustrating an example of an image displayed by an eyepiece unit.

In step S703, the display controller 214g causes an MF icon A1 and an enlargement/reduction icon A2 to be displayed, in an overlapping manner, in the live-view image displayed by the eyepiece display unit 42. More specifically, as illustrated in FIG. 27, the display controller 214g causes the MF icon A1 and the enlargement/reduction icon A2, overlaid on the live-view image W13, to be displayed in the live-view image W12 (FIG. 27(a)) displayed by the eyepiece display unit 42 (FIG. 27(b)).

Subsequently, the control unit 514 determines whether the ring 309a is operated or not (step S704). When the control unit 514 determines that the ring 309a is operated (step S704: Yes), the imaging apparatus 100 proceeds to step S705 explained later. On the other hand, when the control unit 514 determines that the ring 309a is not operated (step S704: No), the imaging apparatus 100 proceeds to step S723 explained later.

In step S705, the control unit 514 determines whether the enlargement/reduction icon A2 is selected or not. When the control unit 514 determines that the enlargement/reduction icon A2 is selected (step S705: Yes), the imaging apparatus 100 proceeds to step S706 explained later. On the other hand, when the control unit 514 determines that the enlargement/reduction icon A2 is not selected (step S705: No), the imaging apparatus 100 proceeds to step S717 explained later.

Figure 28:
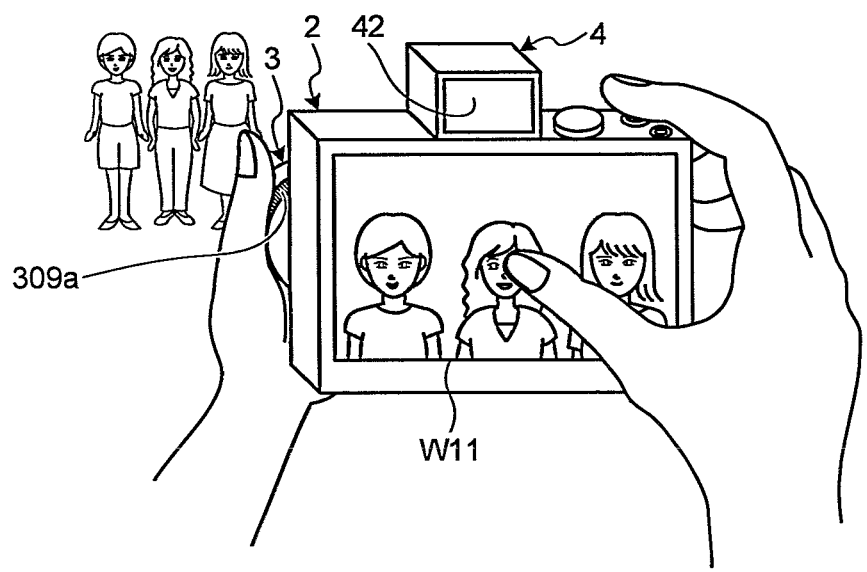
FIG. 28 is a figure schematically illustrating a situation where a user touches an image displayed on the display unit.
Figure 29:
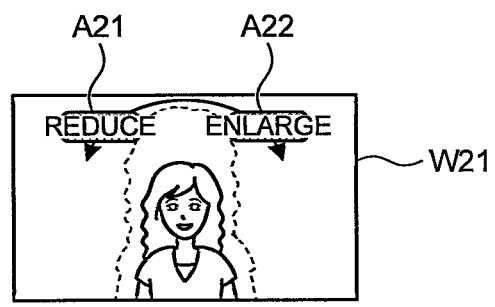
FIG. 29 is a figure illustrating an example of an image displayed by an eyepiece unit.

In step S706, when the user does not keep on touching the touch panel 212 (step S706: No), and the touch panel 212 detects touch operation (step S707: Yes), the display controller 214g causes the eyepiece display unit 42 to display the enlarged image which the trimming unit 214d generates by cropping the target area including the touch position from the live-view image (step S708). More specifically, as illustrated in FIGS. 28 and 29, the display controller 214g causes the eyepiece display unit 42 to display an enlarged image W21 which the trimming unit 214d generates by cropping the target area including the touch position from the live-view image W11. Further, the display controller 214g overlays a reduction icon A21 and a enlargement icon A22 on the enlarged image W21, and displays the enlarged image W21 with the reduction icon A21 and the enlargement icon A22 overlaid thereon.

Subsequently, when the ring 309a is operated (step S709: Yes), the parameter change unit 214e enlarges/reduces the display magnification rate of the enlarged image W21 in accordance with ring operation (step S710). More specifically, as illustrated in FIG. 29, when the ring 309a is operated to the left side, the parameter change unit 214e drives the zoom lens driving unit 302 to move the zoom lens 301a along the optical axis L to the side of the main body unit 2 (wide-angle direction) on the basis of the amount of operation performed with the ring 309a, thus outputting a driving signal for reducing the zoom magnification rate of the lens unit 3. On the other hand, when the ring 309a is operated to the right side, the parameter change unit 214e drives the zoom lens driving unit 302 to move the zoom lens 301a along the optical axis L to the side of the subject (telephoto direction) on the basis of the amount of operation performed with the ring 309a, thus outputting a driving signal for enlarging the zoom magnification rate of the lens unit 3. Accordingly, the user can change the area in which the desired subject appears in the enlarged image W21 to any desired size. It should be noted that the parameter change unit 214e may change the size of the target area which the trimming unit 214d crops from the live-view image W11, so as to enlarge or reduce the enlarged image W21.

Figure 30:
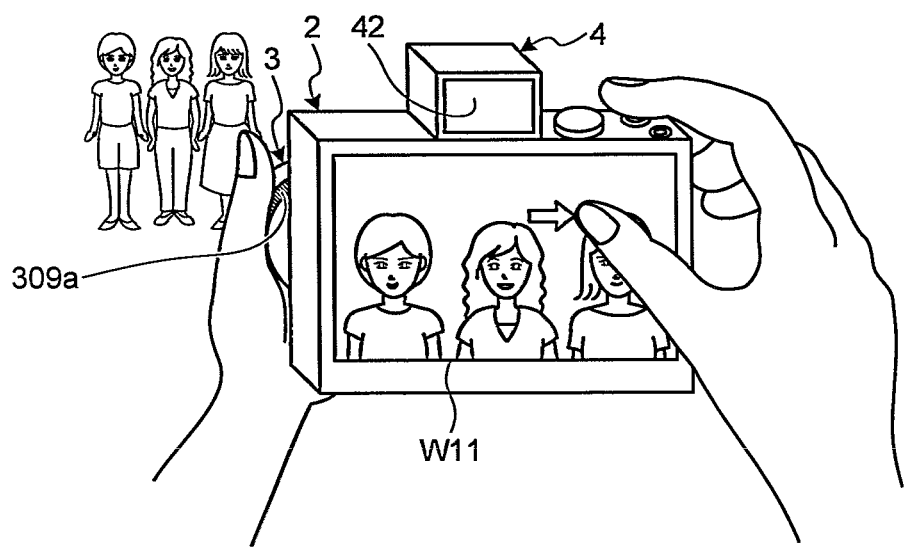
FIG. 30 is a figure schematically illustrating a situation where a user touches an image displayed on the display unit.
Figure 31:
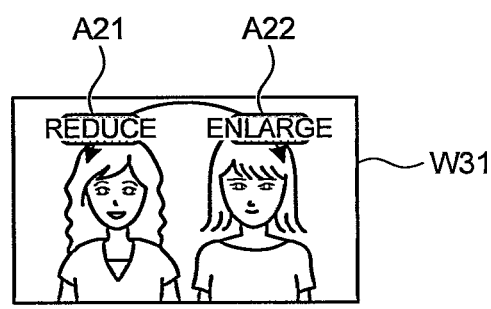
FIG. 31 is a figure illustrating an example of an image displayed by an eyepiece unit.

In step S706, when the user keeps on touching the touch panel 212 (step S706: Yes), the trimming unit 214d changes, in accordance with the touch position, the target area which is cropped out of the live-view image (step S711). More specifically, as illustrated in FIGS. 30 and 31, the trimming unit 214d generates an enlarged image W31 by changing the target area in accordance with the touch position. Thereafter, the imaging apparatus 100 proceeds to step S708.

In step S712, the shooting controller 214f sets MR permission by the MR processing unit 514h. More specifically, the shooting controller 214f changes, from the OFF state to the ON state, the flag indicating that the MR is possible.

Subsequently, when the release switch 210b is pressed halfway down, and a motion picture release signal (1st release signal) for commanding motion picture shooting is input (step S713: Yes), the imaging apparatus 100 performs as follows. When the imaging apparatus 100 is not recording any motion picture (step S714: No), the imaging apparatus 100 starts motion picture shooting (step S715). More specifically, as illustrated in FIG. 32, the MR processing unit 514h causes the storage unit 213 to store, in the order of generation, the live-view image W11 corresponding to the image data on which the image processing unit 214a has performed the image processing and the enlarged image W31 corresponding to the enlarged image data which the trimming unit 214d generates by cropping the target area from the live-view image W11. Therefore, two motion picture shootings can be done. Thereafter, the imaging apparatus 100 returns back to the main routine of FIG. 4 explained above.

When the imaging apparatus 100 is recording a motion picture in step S714 (step S714: Yes), the imaging apparatus 100 terminates the motion picture shooting (step S716), and returns back to the main routine of FIG. 4 explained above.

When the motion picture release signal is not input via the release switch 210b in step S713 (step S713: No), the imaging apparatus 100 returns back to the main routine of FIG. 4 explained above.

When the touch panel 212 does not detect touch operation in step S707 (step S707: No), and the ring is not operated in step S709 (step S709: No), the imaging apparatus 100 proceeds to step S712.

Figure 34:
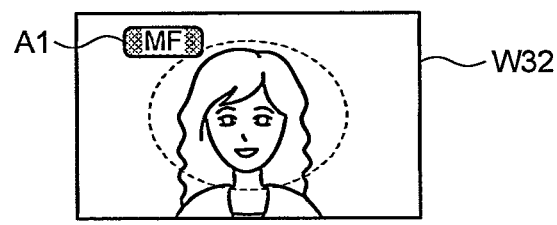
FIG. 34 is a figure illustrating an example of an image displayed by the eyepiece unit.

A case where the control unit 514 determines that the enlargement/reduction icon A2 is not selected in step S705 (step S705: No) will be explained. More specifically, as illustrated in FIG. 33, a case where the user selects the MF icon A1 by operating the ring 309a to the left side will be explained. In this case, when the user does not keep on touching the touch panel 212 (step S717: No), and the touch panel 212 detects touch operation (step S718: Yes), the display controller 214g causes the eyepiece display unit 42 to display the enlarged image which the trimming unit 214d generates by cropping the target area including the touch position from the live-view image (step S719). More specifically, as illustrated in FIG. 34, the display controller 214g causes the eyepiece display unit 42 to display the enlarged image W32 generated by the trimming unit 214d. Further, the display controller 214g overlays the MF icon A1, which is an icon representing the mode content of the current imaging apparatus 100, on the enlarged image W32, and causes the eyepiece display unit 42 to display the enlarged image W32 with the MF icon A1 overlaid thereon.

Subsequently, when the ring 309a is operated (step S720: Yes), the parameter change unit 214e adjusts the focus state of the subject appearing in the enlarged image W32 in accordance with the ring operation (step S721). More specifically, the parameter change unit 214e drives the focus lens driving unit 304 to move the focus lens 301b along the optical axis L to an infinite distant end side or a closest end side in accordance with operation performed with the ring 309a, thus outputting a driving signal for changing the focus state of the lens unit 3 concerning the subject. Accordingly, the user can adjust the focus state of the lens unit 3 concerning the desired subject while looking into the eyepiece unit 4 with easy operation. Thereafter, the imaging apparatus 100 proceeds to step S712.

When the user keeps on touching the touch panel 212 in step S717 (step S717: Yes), the trimming unit 214d changes the target area cropped from the live-view image in accordance with the touch position (step S722). Thereafter, the imaging apparatus 100 proceeds to step S719.

When the touch panel 212 does not detect touch operation in step S718 (step S718: No), and when the ring 309a is not operated in step S720 (step S720: No), the imaging apparatus 100 proceeds to step S712.

In step S723, the control unit 514 determines whether a predetermined time (for example, five seconds) has passed since the eyepiece display unit 42 displays the MF icon A1 or the enlargement/reduction icon A2. When the control unit 514 determines that the predetermined time has passed since the eyepiece display unit 42 displays the MF icon A1 or the enlargement/reduction icon A2 (step S723: Yes), the imaging apparatus 100 proceeds to step S724. On the other hand, when the control unit 514 determines that the predetermined time has not yet passed since the eyepiece display unit 42 displays the MF icon A1 or the enlargement/reduction icon A2 (step S723: No), the imaging apparatus 100 proceeds to step S712.

In step S724, the display controller 214g stops the MF icon A1 or the enlargement/reduction icon A2 displayed by the eyepiece display unit 42 (step S724). Thereafter, the imaging apparatus 100 proceeds to step S712.

When the touch panel 212 detects touch operation in step S725 (step S725: Yes), the shooting controller 214f executes the still picture shooting (step S726). Thereafter, the imaging apparatus 100 returns back to the main routine of FIG. 4 explained above. On the other hand, when the touch panel 212 is not touched (step S725: No), the imaging apparatus 100 returns back to the main routine of FIG. 4 explained above.

Figure 35:
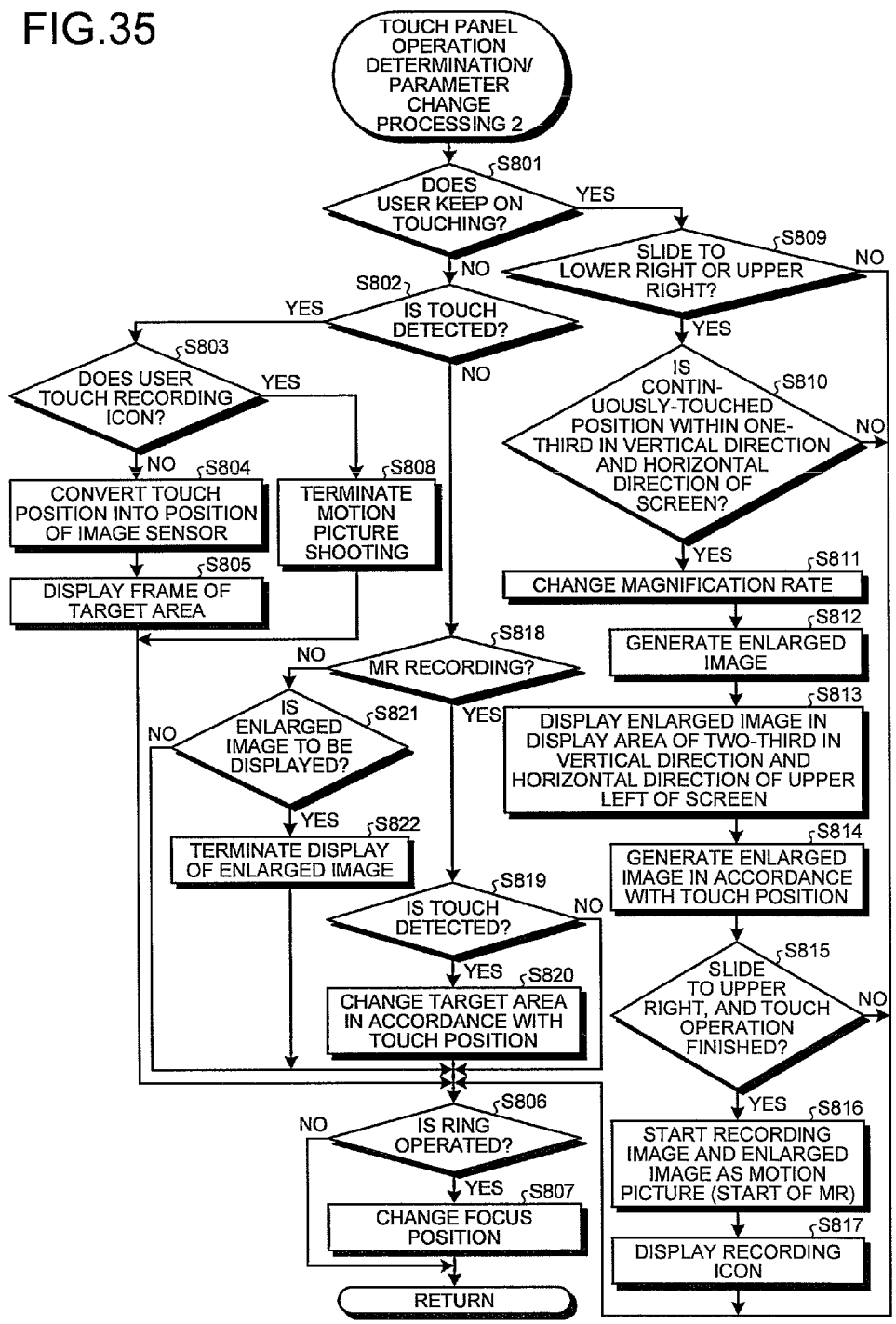
FIG. 35 is a flowchart illustrating overview of touch panel operation determination/parameter change processing 2 executed by the imaging apparatus according to the second embodiment of the present invention.

Subsequently, the touch panel operation determination/parameter change processing 2 in step S110 of FIG. 4 executed by the imaging apparatus 100 according to this second embodiment will be explained. FIG. 35 is a flowchart illustrating overview of the touch panel operation determination/parameter change processing 2 executed by the imaging apparatus 100 according to this second embodiment.

As illustrated in FIG. 35, the control unit 514 determines whether the user keeps on touching the touch panel 212 (step S801). When the control unit 514 determines that the user keeps on touching the touch panel 212 (step S801: Yes), the imaging apparatus 100 proceeds to step S809 explained later. On the other hand, when the control unit 514 determines that the user does not keep on touching the touch panel 212 (step S801: No), the imaging apparatus 100 proceeds to step S802 explained later.

In step S802, the control unit 514 determines whether the touch panel 212 detects touch operation. When the control unit 514 determines that the touch panel 212 detects touch operation (step S802: Yes), the imaging apparatus 100 proceeds to step S803 explained later. On the other hand, when the control unit 514 determines whether the touch panel 212 does not detect touch operation (step S802: No), the imaging apparatus 100 proceeds to step S818 explained later.

In step S803, the control unit 514 determines whether a recording icon displayed on the live-view image displayed by the display unit 211 is touched or not. When the control unit 514 determines that the recording icon displayed on the live-view image displayed by the display unit 211 is touched (step S803: Yes), the imaging apparatus 100 proceeds to step S808 explained later. On the other hand, when the control unit 514 determines that the recording icon displayed on the live-view image displayed by the display unit 211 is not touched (step S803: No), the imaging apparatus 100 proceeds to step S804 explained later. It should be noted that the recording icon displayed by the display unit 211 will be explained later.

Steps S804 to S807 correspond to steps S303 to S306 of FIG. 13, respectively.

In step S808, the imaging apparatus 100 terminates the motion picture shooting (step S808). Thereafter, the imaging apparatus 100 proceeds to step S806.

Figure 36:
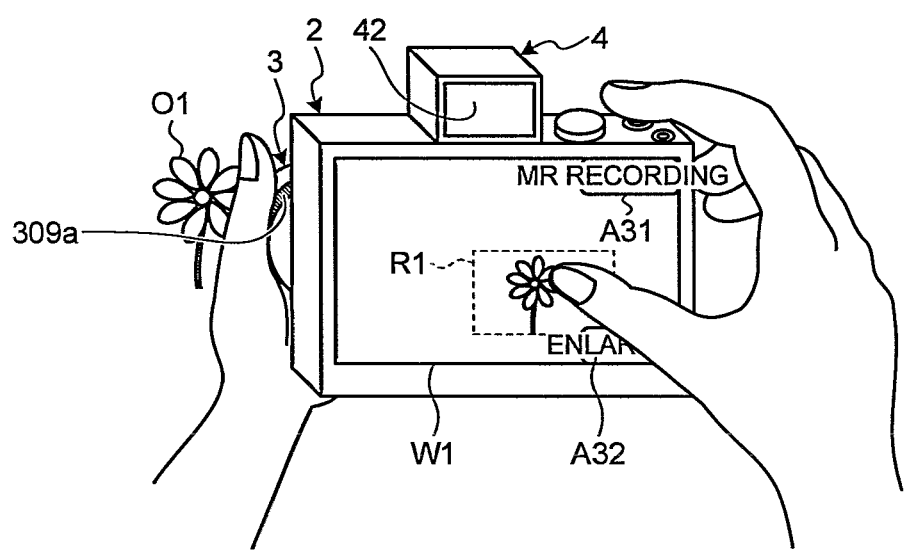
FIG. 36 is a figure illustrating an example of an image displayed on a display unit.

In step S809, the control unit 514 determines whether the user slides the touch position toward the lower right or the upper right of the display unit 211. More specifically, as illustrated in FIG. 36, the control unit 514 determines whether the user slides the touch position to the enlargement/reduction icon A32 displayed at the lower right of the display unit 211 or the MR recording icon A31 displayed at the upper right of the display unit 211. When the user slides the touch position to the lower right or the upper right of the display unit 211 (step S809: Yes), the imaging apparatus 100 proceeds to step S810. On the other hand, when the user does not slide the touch position to the lower right or the upper right of the display unit 211 (step S809: No), the imaging apparatus 100 proceeds to step S806.

In step S810, the control unit 514 determines whether the continuously-touched position is within one-third in the vertical direction and the horizontal direction of the display screen of the display unit 211. When the control unit 514 determines that the continuously-touched position is within one-third of the display screen of the display unit 211 (step S810: Yes), the imaging apparatus 100 proceeds to step S811 explained later. On the other hand, when the control unit 514 determines that the continuously-touched position is not within one-third of the display screen of the display unit 211 (step S810: No), the imaging apparatus 100 proceeds to step S806.

In step S811, the parameter change unit 214e changes the magnification rate of the enlarged image on the basis of the ratio between the slide distance $D_1$ and the slide limitation distance $D_0$.

Subsequently, the trimming unit 214d generates the enlarged image by cropping the target area from the live-view image, on the basis of the magnification rate of the enlarged image changed by the parameter change unit 214e (step S812).

Figure 37:
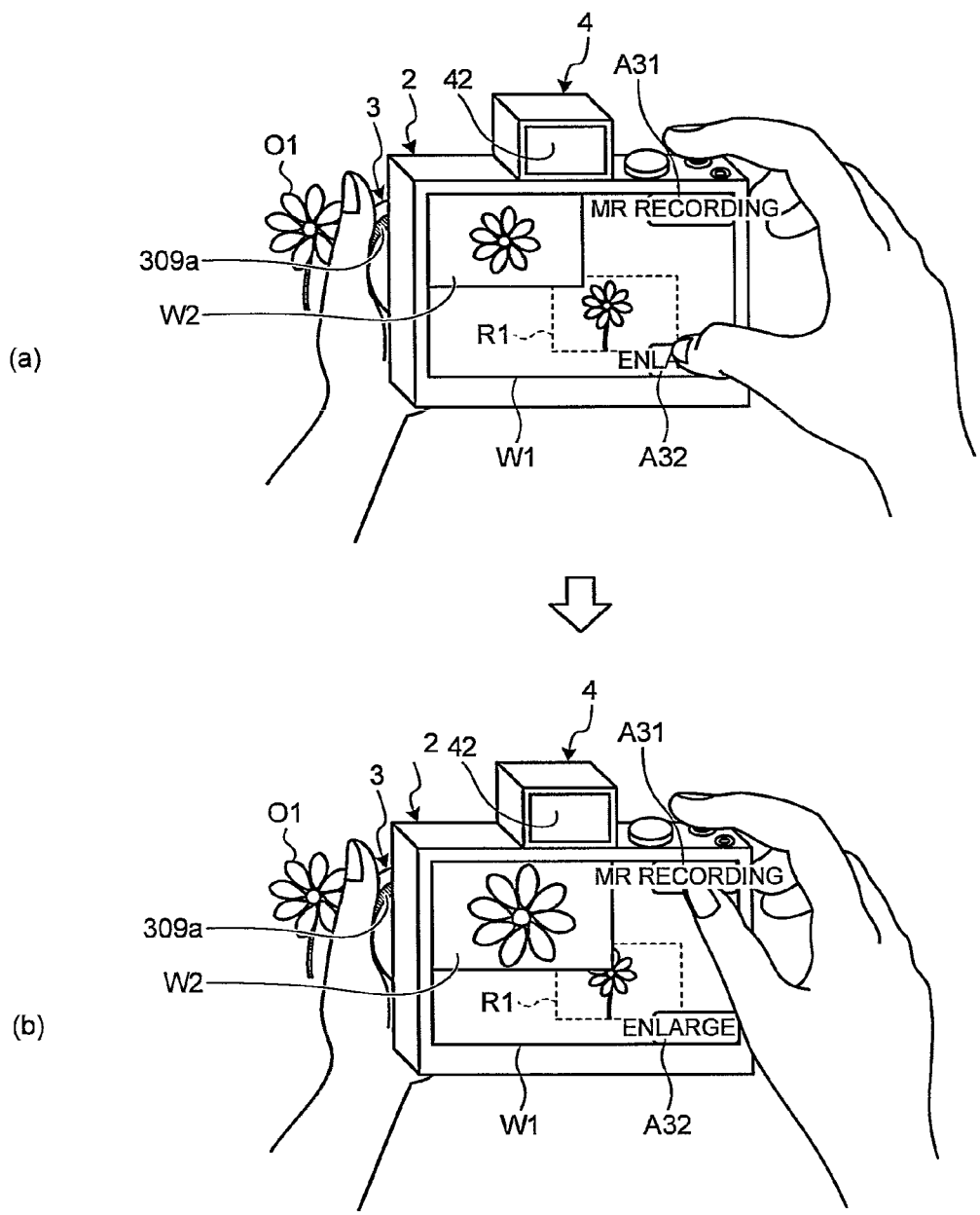
FIG. 37 is a figure schematically illustrating a situation where a user touches an image displayed on the display unit.

Thereafter, the display controller 214g causes the enlarged image generated by the trimming unit 214d to be displayed in the display area of two-third in the vertical direction and the horizontal direction of the upper left of the screen of the display unit 211 (step S813). More specifically, as illustrated in FIG. 37, the display controller 214g causes the enlarged image W2 to be displayed in the display area of two-third in the vertical direction and the horizontal direction of the upper left of the screen of the display unit 211 (FIG. 37(a) to FIG. 37(b)).

Subsequently, the trimming unit 214d generates the enlarged image by changing the target area in accordance with touch operation (step S814).

Thereafter, the control unit 514 determines whether the touch position slides to the upper right, and the touch operation is finished (step S815). More specifically, as illustrated in FIG. 37, the control unit 514 determines whether the user releases his/her finger from the MR recording icon A31 within the live-view image W1 displayed by the display unit 211, on the basis of the position signal which is output from the touch panel 212. When the control unit 514 determines the touch operation is terminated upon the touch position having slid to the upper right (step S815: Yes), the imaging apparatus 100 proceeds to step S816. On the other hand, when the control unit 514 determines the touch operation is not terminated upon the touch position having slid to the upper right (step S815: No), the imaging apparatus 100 proceeds to step S806.

In step S816, the MR processing unit 514h causes the storage unit 213 to store, in the order of generation, the image corresponding to the image data on which the image processing unit 214a has performed the image processing and the enlarged image corresponding to the enlarged image data which the trimming unit 214d generates by cropping the target area from the image. Therefore, the motion picture shooting can be performed to obtain the two images.

Figure 38:
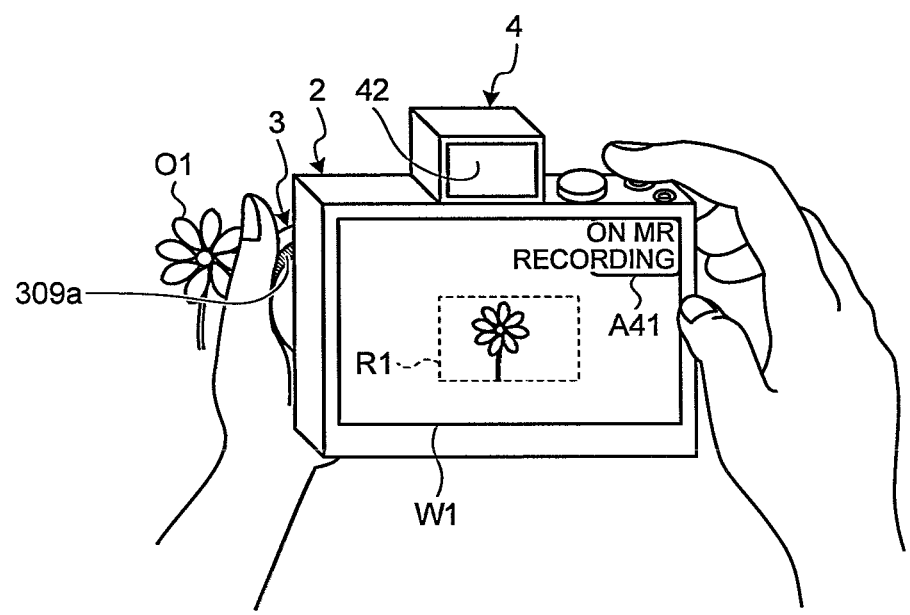
FIG. 38 is a figure schematically illustrating a situation where a user touches an image displayed on the display unit.

Subsequently, the display controller 214g causes the display unit 211 to display the recording icon (step S817). More specifically, as illustrated in FIG. 38, the display controller 214g overlays an MR recording icon A41 on the live-view image W1 displayed by the display unit 211, and displays the live-view image W1 with the MR recording icon A41 overlaid thereon. Accordingly, the user can intuitively understand that the imaging apparatus 100 is performing the MR motion picture shooting. Thereafter, the imaging apparatus 100 proceeds to step S806.

In step S818, the control unit 514 determines whether the imaging apparatus 100 is performing the MR recording or not. When the control unit 514 determines that the imaging apparatus 100 is performing the MR recording (step S818: Yes), the imaging apparatus 100 proceeds to step S819 explained later. On the other hand, when the control unit 514 determines that the imaging apparatus 100 is not performing the MR recording (step S818: No), the imaging apparatus 100 proceeds to step S821 explained later.

In step S819, the control unit 514 determines whether the touch panel 212 detects touch operation. When the control unit 514 determines that the touch panel 212 detects touch operation (step S819: Yes), the parameter change unit 214e changes the target area cropped by the trimming unit 214d, on the basis of the position signal which is output from the touch panel 212 (step S820). Thereafter, the imaging apparatus 100 proceeds to step S806. On the other hand, when the control unit 514 determines that the touch panel 212 does not detect touch operation (step S819: No), the imaging apparatus 100 proceeds to step S806.

Steps S821 and S822 correspond to steps S311 and S312 of FIG. 13, respectively.

According to the second embodiment of the present invention explained above, the user can move the display area of the enlarged image for confirming the focus of the desired subject, and can easily change the display area of the enlarged image and the display magnification rate of the subject included in the enlarged image. As a result, the user can intuitively understand the focus state or the enlargement state/the reduction state of the desired subject while keeping the state of holding the imaging apparatus 100, and can easily and quickly adjust the focus of the subject by operating the ring 309a.

In addition, according to the second embodiment of the present invention, the focus state or the display magnification rate of the subject included in the enlarged image can be easily changed in accordance with operation performed with the ring 309a.

In addition, according to the second embodiment of the present invention, when the touch panel 212 outputs the position signal and this position signal is stopped, the MR processing unit 514h causes the storage unit 213 to store, in the order of generation, the image data on which the image processing unit 214a has performed the image processing and the enlarged image data generated by the trimming unit 214d. Accordingly, the motion picture shooting can be performed instantly to obtain the two images.

Other Embodiments

In the above embodiments, for example, the motion picture shooting in which the imaging unit continuously generates motion pictures has been explained. Alternatively, for example, the present invention can also be applied to consecutive shooting in which still pictures are generated continuously.

In the above embodiments, the eyepiece unit is freely attached to and detached from the main body unit. Alternatively, the eyepiece unit and the main body unit may be formed integrally. Still alternatively, the main body unit and the lens unit may be formed integrally.

In the above embodiments, the image processing unit and the MR processing unit are incorporated into the control unit. Alternatively, for example, the image processing unit and the MR processing unit may be provided separately. Still alternatively, a plurality of image processing units (image engines) may be provided.

In the above embodiments, each of the eyepiece display unit and the display unit displays the image. Alternatively, for example, the present invention can also be applied to a display monitor having two display areas. More specifically, the present invention can also be applied to a cellular phone, a multi-function terminal, and the like having two display units.

In addition, the imaging apparatus according to the present invention can be applied not only a digital single-lens reflex camera but also, for example, electronic apparatuses such as a digital camera and a digital video camera that can be attached with accessories and the like, and a cellular phone and a tablet-type portable apparatus having shooting function.

IN the explanation about the flowchart in this specification, anteroposterior relationship of processing between steps is clarified using expressions such as "first", "thereafter", and "subsequently". However, the order of processing required to carry out the present invention is not uniquely defined by these expressions. More specifically, the order of processing in the flowchart described in this specification can be changed without causing any contradiction.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An imaging apparatus comprising:
an imaging unit that generates image data of a subject image obtained via a lens unit;
a touch panel display unit that (1) displays an image corresponding to the image data generated by the imaging unit, (2) receives a user touch input for specifying a touch position on the touch panel display unit and (3) receives a user slide input for changing a magnification rate;
an eyepiece display unit;
a parameter change unit for changing the magnification rate based on the user slide input, thereby generating an updated magnification rate;
a trimming unit that generates a trimming image by (1) cropping an area determined from the position specified by the received user touch input of the image data, and (2) modifying the cropped area using the updated magnification rate; and
a display controller that controls a display mode of at least one of the eyepiece display unit and the touch panel display unit to display an enlarged image generated from the trimming image.

2. The imaging apparatus according to claim 1 wherein the parameter change unit further changes a parameter concerning a display mode of the enlarged image generated from the trimming image in accordance with the position specified by the received user touch input.

3. The imaging apparatus according to claim 2, wherein the parameter is at least anyone of a focus state of the subject image included in the trimming image, a display area size of the enlarged image generated from the trimming image, a trimming area which the trimming unit crops from the image, and brightness information about the enlarged image generated from the trimming image.

4. The imaging apparatus according to claim 3, wherein the lens unit includes a focus lens for adjusting focus concerning the subject image, and
wherein the input unit includes an operating unit for receiving input of a driving signal for driving the focus lens.

5. The imaging apparatus according to claim 4, wherein the operating unit is provided in the lens unit.

6. The imaging apparatus according to claim 1 further comprising a storage unit that stores, in accordance with order of generation, the image data continuously generated by the imaging unit, and stores, in accordance with order of generation, trimming image data corresponding to the trimming image which the trimming unit generates by successively cropping the area from the image.

7. The imaging apparatus according to claim 1, wherein the eyepiece display unit is an electronic view finder which can be attached to and detached from the imaging apparatus.

8. The imaging apparatus according to claim 1,
wherein the display controller overlays the enlarged image generated from the trimming image on the image, and causes the touch panel display unit to display the image with the enlarged image generated from the trimming image overlaid thereon, and
wherein a display mode of the enlarged image generated from the trimming image is controlled in accordance with changes of position signals which are output from the touch panel display unit.

9. The imaging apparatus according to claim 8 wherein the parameter change unit further changes a parameter concerning the display mode of the enlarged image generated from the trimming image, on the basis of the position specified by the received user touch input, and
wherein the display controller causes the touch panel display unit to display the enlarged image generated from the trimming image of which parameter is changed by the parameter change unit.

10. The imaging apparatus according to claim 9, wherein the parameter is at least anyone of a focus state of the subject image included in the trimming image, a display area size of the enlarged image from the trimming image, a trimming area which the trimming unit crops from the image, and light intensity information about the enlarged image generated from the trimming image.

11. The imaging apparatus according to claim 10, wherein the lens unit includes:
a zoom lens that enlarges the subject image; and
an operating unit that receives input of a driving signal for driving the zoom lens.

12. The imaging apparatus according to claim 11, wherein the operating unit is provided in the lens unit.

13. The imaging apparatus according to claim 8, wherein the trimming image is smaller than a display area of the image.

14. The imaging apparatus according to claim 8 further comprising a storage unit that stores, in accordance with order of generation, the image data continuously generated by the imaging unit, and stores, in accordance with order of generation, trimming image data corresponding to the trimming image which the trimming unit generates by successively cropping the area from the image.

15. The imaging apparatus according to claim 14 further comprising a motion picture processing unit that starts to store the image data and the trimming image data when the position signal which is output from the touch panel is output and then the position signal is stopped.

16. An imaging method executed by an imaging apparatus including an imaging unit that generates image data of a subject image obtained via a lens unit, and a touch panel display unit that displays an image corresponding to the image data generated by the imaging unit, the imaging method comprising:
receiving, from the touch panel display unit, a user touch input for specifying a position on the display unit;
receiving, from the touch panel display unit, a user slide input for changing a magnification rate;
changing the magnification rate based on the received user slide input, thereby generating an updated magnification rate;
generating a trimming image by (1) cropping an area determined from the position specified by the received user touch input of the image data, and (2) modifying the cropped area using the updated magnification rate; and
controlling a display mode of at least one of an eyepiece display unit and the touch panel display unit to display an enlarged image generated from the trimming image.

17. A non-transitory computer-readable storage medium with an executable program stored thereon, wherein a processor is provided in an imaging apparatus including an imaging unit that generates image data of a subject image obtained via a lens unit, and a touch panel display unit that displays an image corresponding to the image data generated by the imaging unit, and wherein the program instructs a processor to perform:
receiving, from the touch panel display unit, a user touch input for specifying a position on the display unit;
receiving, from the touch panel display unit, a user slide input for changing a magnification rate;
changing the magnification rate based on the received user slide input, thereby generating an updated magnification rate;
generating a trimming image by (1) cropping an area determined from the position specified by the received user touch input of the image data, and (2) modifying the cropped area using the updated magnification rate; and
controlling a display mode of at least one of an eyepiece display unit and the touch panel display unit to display an enlarged image generated from the trimming image.

* * * * *